United States Patent
Feldschuh

(10) Patent No.: US 9,922,315 B2
(45) Date of Patent: Mar. 20, 2018

(54) SYSTEMS AND METHODS FOR CALCULATING ACTUAL DOLLAR COSTS FOR ENTITIES

(71) Applicant: Jonathan Feldschuh, New York, NY (US)

(72) Inventor: Jonathan Feldschuh, New York, NY (US)

(73) Assignee: Outseeker Corp., New York, NY (US)

( * ) Notice: Subject to any disclaimer, the term of this patent is extended or adjusted under 35 U.S.C. 154(b) by 81 days.

(21) Appl. No.: 14/592,449

(22) Filed: Jan. 8, 2015

(65) Prior Publication Data

US 2017/0024718 A1    Jan. 26, 2017

(51) Int. Cl.
*G06Q 20/20*    (2012.01)
*G06Q 50/12*    (2012.01)
*G06Q 10/00*    (2012.01)

(52) U.S. Cl.
CPC .......... *G06Q 20/201* (2013.01); *G06Q 50/12* (2013.01)

(58) Field of Classification Search
USPC ......................................................... 705/15
See application file for complete search history.

(56) References Cited

U.S. PATENT DOCUMENTS

| | | | | |
|---|---|---|---|---|
| 6,735,572 B2 * | 5/2004 | Landesmann | .......... | G06Q 20/20 705/14.39 |
| 8,010,404 B1 * | 8/2011 | Wu | ........................ | G06Q 30/02 705/1.1 |
| 2004/0030667 A1 | 2/2004 | Xu | | |
| 2004/0138988 A1 | 7/2004 | Munro | | |
| 2007/0122347 A1 | 5/2007 | Statnikov | | |
| 2007/0271266 A1 | 11/2007 | Acharya | | |
| 2007/0288436 A1 | 12/2007 | Cao | | |
| 2008/0076451 A1 | 3/2008 | Sheha | | |
| 2008/0294501 A1 | 11/2008 | Rennich | | |
| 2009/0019363 A1 | 1/2009 | Andreev | | |
| 2009/0100049 A1 | 4/2009 | Cao | | |
| 2009/0132645 A1 | 5/2009 | Yang | | |
| 2009/0307055 A1 | 12/2009 | Karty | | |
| 2009/0327286 A1 | 12/2009 | Ge | | |
| 2011/0004608 A1 | 1/2011 | Solaro | | |
| 2011/0105852 A1 | 5/2011 | Morris | | |
| 2011/0282823 A1 | 11/2011 | Yahia | | |
| 2012/0016873 A1 | 1/2012 | Mathieson | | |
| 2012/0130814 A1 | 5/2012 | Hayes | | |
| 2012/0136896 A1 | 5/2012 | Tseng | | |
| 2012/0179612 A1 | 7/2012 | Dange | | |

\* cited by examiner

*Primary Examiner* — Garcia Ade
(74) *Attorney, Agent, or Firm* — McCarter & English, LLP

(57) ABSTRACT

Systems, methods, and computer programs for performing calculations of cost of entities are described. According to one embodiment, a method is described wherein one or more data sources are identified; information is gathered from those data sources, which is then used to calculate an adjusted cost of the entities. According to another embodiment, the information gathered from the data sources relates to dollar costs and other information pertaining to the entities, which is used to statistically model cost-related figures pertaining to the entities.

18 Claims, 17 Drawing Sheets

| Restaurant ID | Source 1 Cost | Source 2 Cost | Source 3 Cost | Source 4 Cost | Source 1 Fast Food | Source 3 Delivery | Source 1 Takeout | Source 2 Reservations | Source 1 Dress | Source 2 Dress | Source 3 Dress | Source 4 Dress |
|---|---|---|---|---|---|---|---|---|---|---|---|---|
| r000009 | $18.00 | NA | NA | NA | TRUE | TRUE | TRUE | FALSE | Casual | NA | NA | NA |
| r000010 | $17.00 | $$ | NA | NA | TRUE | TRUE | TRUE | FALSE | Casual | Casual | NA | NA |
| r000019 | $35.00 | $$ | NA | $$ | FALSE | TRUE | TRUE | TRUE | Casual | Casual | NA | Casual Dress |
| r000020 | $33.00 | $$ | NA | NA | FALSE | TRUE | TRUE | FALSE | Casual | Casual | NA | NA |
| r000021 | M | $$ | NA | $$ | TRUE | TRUE | TRUE | TRUE | Casual | Casual | NA | Casual Dress |
| r000022 | NA | NA | NA | $$$ | FALSE | TRUE | TRUE | NA | NA | NA | NA | Casual Dress |
| r000023 | NA | NA | NA | $$$ | FALSE | FALSE | TRUE | NA | NA | NA | NA | Casual Dress |
| r000024 | $39.00 | $$ | $$$ | NA | FALSE | FALSE | TRUE | TRUE | Upscale Casual | Casual | Casual | NA |
| r000025 | NA | $$$ | NA | NA | FALSE | TRUE | TRUE | TRUE | NA | Casual | NA | NA |
| r000026 | $77.00 | $$$$ | $$$$ | $$$$ | FALSE | FALSE | FALSE | TRUE | Upscale Casual | Casual | Casual dressy | Business Casual |
| r000027 | NA | NA | NA | NA | FALSE | FALSE | FALSE | FALSE | NA | NA | NA | NA |
| r000028 | NA | NA | NA | $$$$ | FALSE | FALSE | TRUE | NA | NA | NA | NA | Smart Casual |
| r000029 | NA | NA | NA | $$$$ | FALSE | FALSE | FALSE | NA | NA | NA | NA | Smart Casual |
| r000030 | NA | $$ | NA | NA | FALSE | FALSE | FALSE | FALSE | NA | Casual | NA | NA |
| r000031 | $53.00 | $$$$ | $$$$ | $$$ | FALSE | FALSE | FALSE | TRUE | Upscale Casual | Dressy | Casual dressy | Business Casual |
| r000032 | NA | $$ | NA | $$ | FALSE | TRUE | TRUE | TRUE | NA | Casual | NA | Casual Dress |
| r000033 | $74.00 | $$$$ | $$$$$ | $$$$ | FALSE | FALSE | FALSE | TRUE | Jacket Required | Formal | NA | Jacket Required |
| r000108 | $30.00 | $$ | NA | NA | FALSE | TRUE | TRUE | TRUE | Casual | Casual | Casual | NA |
| r000205 | $36.00 | NA | $$ | NA | FALSE | FALSE | TRUE | TRUE | Casual | Casual | Casual | NA |
| r000206 | $33.00 | $$$ | $$$ | $$$ | FALSE | FALSE | TRUE | TRUE | Casual | Casual | dressy | Smart Casual |

FIG 3

| Restaurant ID | Adjusted Dollar Cost | Dollar Cost Estimate | Calculated Dollar Cost | Source 1 Cost | Source 2 Cost | Source 3 Cost | Source 4 Cost | Source 1 Fast Food | Source 3 Delivery | Source 1 Takeout | Source 2 Reserva-tions | Source 1 Dress | Source 2 Dress | Source 3 Dress | Source 4 Dress |
|---|---|---|---|---|---|---|---|---|---|---|---|---|---|---|---|
| r000009 | $17.50 | $17.00 | $18.00 | $18 | NA | NA | NA | TRUE | TRUE | TRUE | FALSE | Casual | NA | NA | NA |
| r000010 | $17.81 | $18.61 | $17.00 | $17 | $$ | NA | NA | TRUE | TRUE | TRUE | FALSE | Casual | Casual | NA | NA |
| r000019 | $34.25 | $33.51 | $35.00 | $35 | $$ | NA | $$ | FALSE | TRUE | TRUE | TRUE | Casual | Casual | NA | Casual Dress |
| r000020 | $31.76 | $30.53 | $33.00 | $33 | $$ | NA | NA | FALSE | TRUE | TRUE | FALSE | Casual | Casual | NA | NA |
| r000021 | $33.71 | $33.71 | NA | M | $$ | NA | $$ | TRUE | TRUE | TRUE | TRUE | Casual | Casual | NA | Casual Dress |
| r000022 | $43.28 | $43.28 | NA | NA | NA | NA | $$$ | FALSE | TRUE | TRUE | NA | NA | NA | NA | Casual Dress |
| r000023 | $45.84 | $45.84 | NA | NA | NA | NA | $$$ | FALSE | FALSE | TRUE | NA | NA | NA | NA | Casual Dress |
| r000024 | $41.25 | $43.50 | $39.00 | $39 | $$ | $$ | NA | FALSE | FALSE | TRUE | TRUE | Upscale Casual | Casual | Casual | NA |
| r000025 | $41.28 | $41.28 | NA | NA | $$$ | NA | $$$$ | FALSE | TRUE | TRUE | TRUE | NA | Casual | NA | NA |
| r000026 | $75.60 | $74.20 | $77.00 | $77 | $$$$ | $$$$ | $$$$ | FALSE | FALSE | FALSE | TRUE | Upscale Casual | Casual | Casual dressy | Business Casual |
| r000027 | $30.37 | $30.37 | NA | NA | NA | NA | NA | FALSE | FALSE | FALSE | FALSE | NA | NA | NA | NA |
| r000028 | $69.56 | $69.56 | NA | NA | NA | NA | $$$$ | FALSE | FALSE | TRUE | NA | NA | NA | NA | Smart Casual |
| r000029 | $71.81 | $71.81 | NA | NA | NA | NA | $$$$ | FALSE | FALSE | FALSE | NA | NA | NA | NA | Smart Casual |
| r000030 | $31.19 | $31.19 | NA | NA | $$ | NA | NA | FALSE | FALSE | FALSE | FALSE | NA | Casual | NA | NA |
| r000031 | $64.24 | $75.48 | $53.00 | $53 | $$$$ | $$$$ | $$$ | FALSE | FALSE | FALSE | TRUE | Upscale Casual | Dressy | Casual dressy | Business Casual |
| r000032 | $32.88 | $32.88 | NA | NA | $$ | NA | $$ | FALSE | TRUE | TRUE | TRUE | NA | Casual | NA | Casual Dress |
| r000033 | $94.37 | $114.75 | $74.00 | $74 | $$$$ | $$$$$$ | $$$$ | FALSE | FALSE | FALSE | TRUE | Jacket Required | Formal | NA | Jacket Required |
| r000108 | $34.58 | $39.17 | $30.00 | $30 | $$ | $$ | NA | FALSE | TRUE | TRUE | TRUE | Casual | Casual | Casual | NA |
| r000205 | $39.12 | $42.24 | $36.00 | $36 | $$ | $$ | NA | FALSE | FALSE | TRUE | TRUE | Casual | Casual | Casual | NA |
| r000206 | $44.79 | $56.57 | $33.00 | $33 | $$$ | $$$ | $$$ | FALSE | FALSE | TRUE | TRUE | Upscale Casual | Casual | Casual dressy | Smart Casual |

FIG 4

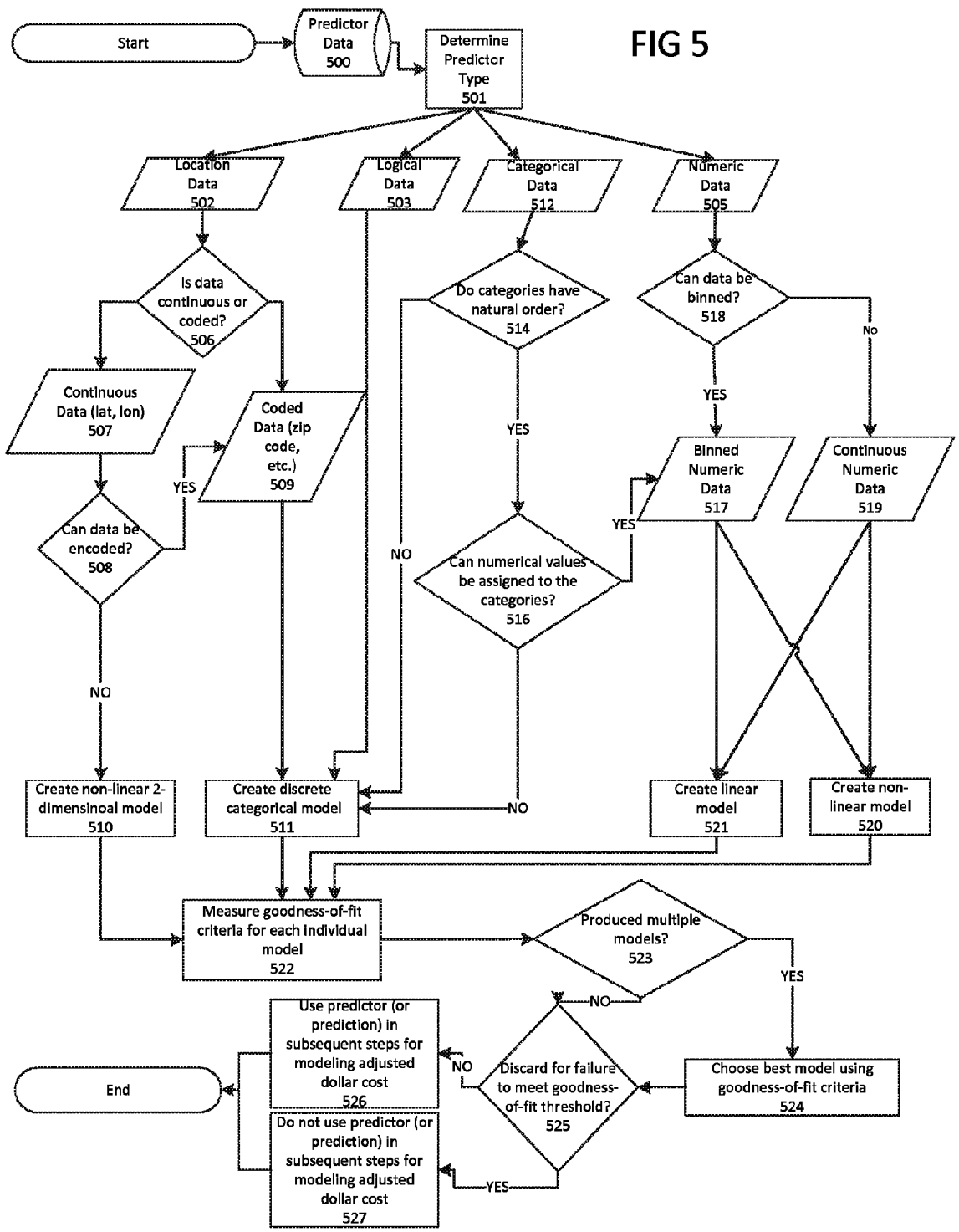

| Row | Predictor | Type of Model | Goodness of Fit | Selected as best model? | Discarded because not best model? | Discarded for Failure to Meet Goodness of Fit Threshold of 0.3? | Used in Subsequent Steps of Modeling of Adjusted Cost? |
|---|---|---|---|---|---|---|---|
| 1 | Source 2 Noise Level | Linear | 0.25 | | Yes | NA | |
| 2 | Source 2 Noise Level | Linear (Binned) | 0.26 | | Yes | NA | |
| 3 | Source 2 Noise Level | Non-Linear | 0.29 | Yes | | Yes | |
| 4 | Source 2 Noise Level | Categorical | 0.26 | | Yes | NA | |
| 5 | Source 2 Dress | Linear | 0.47 | | Yes | NA | |
| 6 | Source 2 Dress | Non-Linear | 0.56 | | Yes | NA | |
| 7 | Source 2 Dress | Categorical | 0.58 | Yes | | No | Yes |
| 8 | Source 2 Location | non-linear 2D model | 0.22 | | Yes | NA | |
| 9 | Source 2 Location | Categorical - zipcode | 0.19 | | Yes | NA | |
| 10 | Source 2 Location | Categorical - neighborhood | 0.24 | Yes | | Yes | |
| 11 | Source 2 Takes Reservations | Categorical | 0.32 | Yes | | No | Yes |
| 12 | Source 2 Has Garden | Categorical | 0.17 | Yes | | Yes | |
| 13 | Source 2 Cost | Categorical | 0.72 | Yes | | No | Yes |
| 14 | Source 2 Fast Food | categorical | 0.31 | Yes | | No | Yes |

FIG 6

| Row Number | Calculated Dollar Cost | Source 1 Cost | Source 2 Cost | Source 3 Cost | Source 4 Cost | Number of Missing Values | Number of Cases | Percentage of Cases |
|---|---|---|---|---|---|---|---|---|
| 1 | 1 | 1 | 1 | 1 | 1 | 0 | 79 | 0.5% |
| 2 | 1 | 1 | 1 | 0 | 1 | 1 | 14 | 0.1% |
| 3 | 1 | 1 | 1 | 1 | 0 | 1 | 46 | 0.3% |
| 4 | 1 | 1 | 1 | 1 | 1 | 1 | 567 | 3.9% |
| 5 | 0 | 0 | 1 | 1 | 1 | 2 | 1 | 0.0% |
| 6 | 1 | 1 | 1 | 0 | 0 | 2 | 1 | 0.0% |
| 7 | 1 | 1 | 1 | 0 | 1 | 2 | 56 | 0.4% |
| 8 | 1 | 1 | 0 | 1 | 1 | 2 | 8 | 0.1% |
| 9 | 1 | 1 | 1 | 0 | 1 | 2 | 406 | 2.8% |
| 10 | 1 | 1 | 1 | 1 | 0 | 2 | 403 | 2.8% |
| 11 | 0 | 0 | 1 | 0 | 1 | 3 | 3 | 0.0% |
| 12 | 0 | 0 | 1 | 1 | 0 | 3 | 1 | 0.0% |
| 13 | 1 | 1 | 0 | 0 | 0 | 3 | 3 | 0.0% |
| 14 | 0 | 0 | 1 | 1 | 1 | 3 | 92 | 0.6% |
| 15 | 1 | 1 | 0 | 0 | 1 | 3 | 14 | 0.1% |
| 16 | 1 | 1 | 0 | 1 | 0 | 3 | 17 | 0.1% |
| 17 | 1 | 1 | 1 | 0 | 0 | 3 | 1312 | 9.0% |
| 18 | 0 | 0 | 0 | 1 | 0 | 4 | 1 | 0.0% |
| 19 | 0 | 0 | 0 | 0 | 1 | 4 | 8 | 0.1% |
| 20 | 0 | 0 | 1 | 0 | 1 | 4 | 14 | 0.1% |
| 21 | 0 | 0 | 1 | 0 | 0 | 4 | 424 | 2.9% |
| 22 | 0 | 0 | 1 | 1 | 0 | 4 | 97 | 0.7% |
| 23 | 1 | 1 | 0 | 0 | 1 | 4 | 130 | 0.9% |
| 24 | 0 | 0 | 0 | 0 | 0 | 5 | 1117 | 7.7% |
| 25 | 0 | 0 | 0 | 1 | 0 | 5 | 19 | 0.1% |
| 26 | 0 | 0 | 1 | 0 | 0 | 5 | 8010 | 55.1% |
| 27 | 0 | 0 | 0 | 0 | 0 | 6 | 1690 | 11.6% |
| | | | | | | Total Cases: | 14533 | 100.0% |

FIG 7

| Row Number | Calculated Dollar Cost | Source 1 Cost | Source 2 Cost | Source 3 Cost | Source 4 Cost | Source 5 Cost | Number of Missing Values | Number of Cases | Cases with and without Calculated Dollar Cost | Cases Source 2 | Cases Source 3 | Cases Source 4 |
|---|---|---|---|---|---|---|---|---|---|---|---|---|
| 1 | 1 | 1 | 1 | 1 | 1 | 1 | 0 | 79 | 3056 | 2883 | 1095 | 646 |
| 2 | 1 | 1 | 1 | 1 | 1 | 0 | 1 | 567 | | | | |
| 3 | 1 | 1 | 1 | 1 | 0 | 1 | 1 | 46 | | | | 449 |
| 4 | 1 | 1 | 1 | 1 | 0 | 0 | 2 | 403 | | | | |
| 5 | 1 | 1 | 1 | 0 | 1 | 1 | 1 | 14 | | | 1788 | 420 |
| 6 | 1 | 1 | 1 | 0 | 1 | 0 | 2 | 406 | | | | |
| 7 | 1 | 1 | 1 | 0 | 0 | 1 | 2 | 56 | | | | 1368 |
| 8 | 1 | 1 | 1 | 0 | 0 | 0 | 3 | 1312 | | | | |
| 9 | 1 | 1 | 0 | 1 | 1 | 0 | 2 | 8 | | 173 | 26 | 8 |
| 10 | 1 | 1 | 0 | 1 | 0 | 1 | 2 | 1 | | | | 18 |
| 11 | 1 | 1 | 0 | 1 | 0 | 0 | 3 | 17 | | | | |
| 12 | 1 | 1 | 0 | 0 | 1 | 0 | 3 | 14 | | | 147 | 14 |
| 13 | 1 | 1 | 0 | 0 | 0 | 1 | 3 | 3 | | | | 133 |
| 14 | 1 | 1 | 0 | 0 | 0 | 0 | 4 | 130 | | | | |
| 15 | 0 | 0 | 1 | 1 | 1 | 1 | 2 | 1 | 11477 | 8636 | 191 | 93 |
| 16 | 0 | 0 | 1 | 1 | 1 | 0 | 3 | 92 | | | | |
| 17 | 0 | 0 | 1 | 1 | 0 | 1 | 3 | 1 | | | | 98 |
| 18 | 0 | 0 | 1 | 1 | 0 | 0 | 4 | 97 | | | | |
| 19 | 0 | 0 | 1 | 0 | 1 | 1 | 3 | 3 | | | 8445 | 427 |
| 20 | 0 | 0 | 1 | 0 | 1 | 0 | 4 | 424 | | | | |
| 21 | 0 | 0 | 1 | 0 | 0 | 1 | 4 | 8 | | | | 8018 |
| 22 | 0 | 0 | 1 | 0 | 0 | 0 | 5 | 8010 | | | | |
| 23 | 0 | 0 | 0 | 1 | 1 | 0 | 4 | 14 | | 2841 | 34 | 14 |
| 24 | 0 | 0 | 0 | 1 | 0 | 1 | 4 | 1 | | | | 20 |
| 25 | 0 | 0 | 0 | 1 | 0 | 0 | 5 | 19 | | | | |
| 26 | 0 | 0 | 0 | 0 | 1 | 0 | 5 | 1117 | | | 2807 | 1117 |
| 27 | 0 | 0 | 0 | 0 | 0 | 0 | 6 | 1690 | | | | 1690 |
| | | | | | | | Total Cases: | 14533 | 14533 | 14533 | 14533 | 14533 |

FIG 8

| Row Number | Calculated Dollar Cost | Source 2 Cost | Source 2 Dress | Source 2 NoiseLevel | Row Uniformity Source 2 | Number of Missing Values | Number of Cases | Percentage of Cases | Uniformity Percentage of Cases |
|---|---|---|---|---|---|---|---|---|---|
| 1 | 1 | 1 | 1 | 1 | TRUE | 0 | 2811 | 92.0% | 98.8% |
| 2 | 1 | 0 | 0 | 0 | TRUE | 3 | 206 | 6.7% | 1.2% |
| 3 | 1 | 1 | 1 | 0 | FALSE | 1 | 26 | 0.9% | |
| 4 | 1 | 1 | 0 | 0 | FALSE | 2 | 5 | 0.2% | |
| 5 | 1 | 0 | 0 | 1 | FALSE | 2 | 3 | 0.1% | |
| 6 | 1 | 1 | 0 | 1 | FALSE | 1 | 2 | 0.1% | |
| 7 | 1 | 0 | 1 | 1 | FALSE | 1 | 1 | 0.0% | |
| 8 | 1 | 0 | 1 | 0 | FALSE | 2 | 1 | 0.0% | |
| | | | | | | Total Cases: | 3055 | 100.0% | |

FIG 9A

| Row Number | Calculated Dollar Cost | Source 2 Cost | Source 2 Dress | Source 2 Noise Level | Source 4 Cost | Source 4 Dress | Source 4 Overall | Row Uniformity Source 2 | Row Uniformity Source 4 | Joint Row Uniformity Source 2 and 4 | Number of Missing Values | Number of Cases | Percentage of Cases | Uniformity Percentage of Cases |
|---|---|---|---|---|---|---|---|---|---|---|---|---|---|---|
| 1 | 1 | 1 | 1 | 1 | 0 | 0 | 0 | TRUE | TRUE | TRUE | 3 | 1722 | 56.4% | 97.7% |
| 2 | 1 | 1 | 1 | 1 | 1 | 1 | 1 | TRUE | TRUE | TRUE | 0 | 1058 | 34.6% | |
| 3 | 1 | 0 | 0 | 0 | 0 | 0 | 0 | TRUE | TRUE | TRUE | 6 | 179 | 5.9% | |
| 4 | 1 | 0 | 0 | 0 | 1 | 1 | 1 | TRUE | TRUE | TRUE | 3 | 25 | 0.8% | 2.3% |
| 5 | 1 | 1 | 1 | 0 | 0 | 0 | 0 | FALSE | TRUE | FALSE | 4 | 23 | 0.8% | |
| 6 | 1 | 1 | 1 | 0 | 1 | 1 | 1 | FALSE | TRUE | FALSE | 1 | 3 | 0.1% | |
| 7 | 1 | 1 | 1 | 1 | 1 | 1 | 0 | TRUE | FALSE | FALSE | 1 | 29 | 0.9% | |
| 8 | 1 | 1 | 0 | 0 | 0 | 0 | 0 | FALSE | TRUE | FALSE | 5 | 5 | 0.2% | |
| 9 | 1 | 0 | 0 | 1 | 0 | 0 | 0 | FALSE | TRUE | FALSE | 5 | 3 | 0.1% | |
| 10 | 1 | 1 | 1 | 1 | 1 | 0 | 1 | TRUE | FALSE | FALSE | 1 | 2 | 0.1% | |
| 11 | 1 | 0 | 0 | 0 | 1 | 1 | 0 | TRUE | FALSE | FALSE | 4 | 2 | 0.1% | |
| 12 | 1 | 1 | 0 | 1 | 1 | 1 | 0 | FALSE | FALSE | FALSE | 2 | 1 | 0.0% | |
| 13 | 1 | 0 | 1 | 1 | 0 | 0 | 0 | FALSE | TRUE | FALSE | 4 | 1 | 0.0% | |
| 14 | 1 | 1 | 0 | 1 | 0 | 0 | 0 | FALSE | TRUE | FALSE | 4 | 1 | 0.0% | |
| 15 | 1 | 0 | 1 | 0 | 0 | 0 | 0 | FALSE | TRUE | FALSE | 5 | 1 | 0.0% | |

Total Cases: 3055

FIG 9B

| Row Number | Calculate Dollar Cost | Source 2 Dress | Source 4 Dress | Number of Missing Values | Number of Cases |
|---|---|---|---|---|---|
| 1 | 1 | 1 | 1 | 0 | 1090 |
| 2 | 1 | 0 | 1 | 1 | 28 |
| 3 | 1 | 1 | 0 | 1 | 1749 |
| 4 | 1 | 0 | 0 | 2 | 188 |

Pairwise presence: 38.0%

FIG 9C

| Row Number | Calculate Dollar Cost | Source 2 Dress | Source 2 NoiseLevel | Number of Missing Values | Number of Cases |
|---|---|---|---|---|---|
| 1 | 1 | 1 | 1 | 0 | 2812 |
| 2 | 1 | 0 | 1 | 1 | 5 |
| 3 | 1 | 1 | 0 | 1 | 27 |
| 4 | 1 | 0 | 0 | 2 | 211 |

Pairwise presence: 98.9%

FIG 9D

| Cost | $ | $$ | $$$ | $$$$ |
|---|---|---|---|---|
| Dollar Cost Estimate | 16 | 27 | 45 | 82 |

FIG 13A

| Cost | $ | $$ | $$$ | $$$$ | NA |
|---|---|---|---|---|---|
| Dollar Cost Estimate | 16 | 27 | 45 | 82 | 25 |

FIG 13B

| Cost | $ | $$ | $$$ | $$$$ | $ | $$ | $$$ | $$$$ |
|---|---|---|---|---|---|---|---|---|
| Fast Food | T | T | T | T | F | F | F | F |
| Dollar Cost Estimate | 6 | 11 | 18 | 30 | 18 | 33 | 48 | 85 |

FIG 14A

| Cost | $ | $$ | $$$ | $$$$ | NA | $ | $$ | $$$ | $$$$ | NA | $ | $$ | $$$ | $$$$ | NA |
|---|---|---|---|---|---|---|---|---|---|---|---|---|---|---|---|
| Fast Food | T | T | T | T | T | F | F | F | F | F | NA | NA | NA | NA | NA |
| Dollar Cost Estimate | 6 | 11 | 18 | 30 | 9 | 18 | 33 | 48 | 85 | 29 | NA | 16 | 26 | 41 | 50 | 23 |

FIG 14B

| Restaurant ID | Adjusted Dollar Cost using Source 4 Dollar Cost Estimate | Dollar Cost Estimate from Source 4 Predictor Variables | Adjusted Dollar Cost using Source 2 Dollar Cost Estimate | Dollar Cost Estimate from Source 2 Predictor Variables | Dependent Variable for Source 2 Predictor Variables | Source 1 Cost | Source 2 Cost | Source 2 Dress | Source 2 Fast Food | Source 2 Takes Reservations | Source 4 Cost | Source 4 Dress |
|---|---|---|---|---|---|---|---|---|---|---|---|---|
| r000009 | $19.86 | NA | $19.86 | $22.64 | $18.00 | $18 | NA | NA | TRUE | FALSE | NA | NA |
| r000010 | $19.02 | NA | $19.02 | $22.05 | $17.00 | $17 | $$ | Casual | TRUE | FALSE | NA | NA |
| r000019 | $35.23 | $36.09 | $34.94 | $34.86 | $35.00 | $35 | $$ | Casual | FALSE | TRUE | $$ | Casual Dress |
| r000020 | $30.73 | NA | $30.73 | $27.32 | $33.00 | $33 | $$ | Casual | FALSE | FALSE | NA | NA |
| r000021 | $35.17 | $36.09 | $34.86 | $34.86 | NA | NA | $$ | Casual | FALSE | TRUE | $$ | Casual Dress |
| r000022 | $47.87 | $47.87 | NA | NA | NA | NA | NA | NA | NA | NA | $$$ | Casual Dress |
| r000023 | $47.87 | $47.87 | NA | NA | NA | NA | $$ | Casual | FALSE | NA | $$$ | Casual Dress |
| r000024 | $37.34 | NA | $37.34 | $34.86 | $39.00 | $39 | $$$ | Casual | FALSE | TRUE | NA | NA |
| r000025 | $50.75 | NA | $50.75 | $50.75 | NA | NA | NA | NA | NA | TRUE | NA | NA |
| r000026 | $76.65 | $77.21 | $76.46 | $75.65 | $77.00 | $77 | $$$$ | Casual | FALSE | TRUE | $$$$ | Business Casual |
| r000027 | NA | NA | NA | NA | NA | NA | NA | NA | NA | NA | NA | NA |
| r000028 | $73.64 | $73.64 | NA | NA | NA | NA | NA | NA | NA | NA | $$$$ | Smart Casual |
| r000029 | $73.64 | $73.64 | NA | NA | NA | NA | NA | NA | NA | NA | $$$$ | Smart Casual |
| r000030 | $27.32 | NA | $27.32 | $27.32 | NA | NA | $$ | Casual | FALSE | FALSE | NA | NA |
| r000031 | $63.57 | $56.75 | $65.84 | $85.09 | $53.00 | $53 | $$$$ | Dressy | FALSE | TRUE | $$$ | Business Casual |
| r000032 | $35.17 | $36.09 | $34.86 | $34.86 | NA | NA | $$ | Casual | FALSE | TRUE | $$ | Casual Dress |
| r000033 | $97.90 | $118.19 | $91.14 | $116.85 | $74.00 | $74 | $$$$ | Formal | FALSE | TRUE | $$$$ | Jacket Required |
| r000108 | $31.94 | NA | $31.94 | $34.86 | $30.00 | $30 | $$ | Casual | FALSE | TRUE | NA | NA |
| r000205 | $35.54 | NA | $35.54 | $34.86 | $36.00 | $36 | $$ | Casual | FALSE | TRUE | NA | NA |
| r000206 | $43.37 | $53.18 | $40.10 | $50.75 | $33.00 | $33 | $$$ | Casual | FALSE | TRUE | $$$ | Smart Casual |

FIG 15

SYSTEMS AND METHODS FOR CALCULATING ACTUAL DOLLAR COSTS FOR ENTITIES

BACKGROUND OF THE INVENTION

Field of the Invention (Technical Field)

Embodiments of the present invention relate to predicting dollar cost estimates based on related predictor variables obtained from one or more data sources. The dollar cost estimates provide a more accurate and reliable figure of the actual dollar cost of the entities to which they pertain.

Description of Related Art

Consumers often use the internet to research the dollar cost of entities, such as restaurants, hotels, attractions, or services, to aid in choosing a specific entity to visit or purchase. They may do so on websites that host information about entities of interest. For example, someone seeking the dollar cost of local restaurants may use a site like Zagats.com or Yelp.com. The dollar cost provided by such sites is usually a fixed cost for a particular selection of services or products. For instance, a website like Orbitz.com might post the average dollar cost of a nightly stay at a particular hotel. Different sites may post different dollar costs for the same entity based on differing criteria for determining cost, which may cause consumer confusion when trying to choose a particular entity. The data on dollar cost available to a consumer may be missing, inaccurate, or only an approximation. This is in contrast to cost information concerning items directly for sale on a website or in a store, where every item will generally have a clearly defined dollar cost, and those that do not will essentially be unavailable for purchase.

In addition to entities' dollar costs, websites often provide a host of other information pertaining to entities of interest. A site like Zagats.com or Yelp.com, for instance, might provide information like ratings of restaurants' food quality, the location of restaurants, the dress code, or even symbolic information about cost like a set of increasing dollar signs ($, $$, $$$, $$$$). Consumers often attempt to evaluate and choose entities based on the dollar cost and other information provided by such websites with no means of measuring the quantitative relationship between different types of information and dollar cost. There may be, however, a mathematical relationship between dollar cost and other information. For example higher ratings and better locations may both correlate to higher dollar costs for a group of restaurants, but the human mind is unable to calculate those relationships and apply them to select the entity with the best value for the money. This is especially true when there is a large number or entities to choose from. The consumer ends up choosing on gut instinct and may not be pleased with the end result.

Consumers would benefit from a means for consolidating information about entities from one or more websites and mathematically correlating as much information as possible to the fixed dollar costs of the entities to generate an adjusted, more realistic estimate of the price of the restaurant. Similarly, when dollar cost is unavailable, consumers may benefit from a statistically determined dollar cost based on other available information about the entities. Specifically, calculating a cost in dollars for entities based on statistically modeling the relationships between dollar costs and other information would provide a useful mechanism for distinguishing between the true price of entities. For example, modeling the relationship between the costs of restaurants to, for example, their location and dress code can form the basis for calculating adjusted dollar cost figures. Consumers could then quantitatively compare a single adjusted dollar cost figure to the dollar costs available from various data sources for each entity, thereby providing a simple mechanism for gauging the true value of entities based on all available information. Accordingly, there is a need for methods to statistically model adjusted dollar cost for entities based on the relationships between cost and other information.

BRIEF SUMMARY OF EMBODIMENTS OF THE PRESENT INVENTION

The following presents a simplified summary in order to provide a basic understanding of various embodiments described herein. This summary is not an extensive overview, and it is not intended to identify key and/or critical elements or to delineate the scope thereof. The sole purpose of this summary is to present some concepts in a simplified form as a prelude to the more detailed description that follows.

Various example embodiments describe systems, method, and computer program products for facilitating user determinations of entities to visit or purchase using an adjusted dollar cost.

One embodiment provides a system for executing software to generate adjusted dollar cost information, which comprises a processor, a computer readable memory coupled to the processor, a network interface coupled to the processor, and software stored in the computer readable memory and executable by the processor.

The software, in this embodiment, is programmed to identify one or more data sources with information about entities, obtain one or more dollar costs and one or more predictor variables about the entities from the data sources, store the dollar costs and the predictor variables in a database, calculate calculated dollar costs from one or more of the dollar costs for the entities with one or more dollar costs in their record, identify groups, determine the order of the groups for use in predicting the dollar cost estimates, predict the dollar cost estimates by joint modeling the calculated dollar costs or adjusted dollar costs as the independent variable and using one or more of the groups as the independent variables, and calculate adjusted dollar costs for one or more of the entities that have a dollar cost estimate in their record from at least in part the dollar cost estimates for those entities.

The method of one embodiment comprises identifying one or more data sources with information about entities, obtaining one or more dollar costs and one or more predictor variables about the entities from the data sources, storing the dollar costs and the predictor variables in a database, calculating calculated dollar costs from one or more of the dollar costs for the entities with one or more dollar costs in their record, identifying, determining the order of the groups for use in predicting the dollar cost estimates, predicting the dollar cost estimates by joint modeling the calculated dollar costs or adjusted dollar costs as the independent variable and using one or more of the groups as the independent variables, and calculating adjusted dollar costs for one or more of the entities that have a dollar cost estimate in their record from at least in part the dollar cost estimates for those entities.

The software product includes a computer readable non-transitory storage medium comprising identifying one or more data sources with information about entities, obtaining one or more dollar costs and one or more predictor variables about the entities from the data sources, storing the dollar costs and the predictor variables in a database, calculating calculated dollar costs from one or more of the dollar costs for the entities with one or more dollar costs in their record, identifying, determining the order of the groups for use in predicting the dollar cost estimates, predicting the dollar cost estimates by joint modeling the calculated dollar costs or adjusted dollar costs as the independent variable and using one or more of the groups as the independent variables, and calculating adjusted dollar costs for one or more of the entities that have a dollar cost estimate in their record from at least in part the dollar cost estimates for those entities.

BRIEF DESCRIPTION OF THE SEVERAL VIEWS OF THE DRAWINGS

The drawings, which are incorporated herein, illustrate one or more embodiments of the present invention, thus helping to better explain one or more aspects of the one or more embodiments. As such, the drawings are not to be construed as limiting any particular aspect of any embodiment of the invention. In the drawings:

FIG. 3 shows a data table that a database might contain after obtaining data from one or more data sources according to one embodiment.

FIG. 4 shows a data table that a database might contain following the completion of the process in FIG. 2 according to one embodiment.

FIG. 5 shows a flowchart for the individual modeling process for the purpose of selecting which predictor variables or predictions of their individual models will be used in subsequent groups.

FIG. 6 shows a table that exemplifies how the goodness-of-fit is applied to the modeled predictor variable data according to one embodiment.

FIG. 7 shows an exemplary missing data pattern table according to one embodiment.

FIG. 8 shows an exemplary missing data pattern table according to another embodiment.

FIG. 9A shows a missing data pattern table for a prospective model of calculated dollar cost using three attributes from the same data source, Source 2 Cost, Source 2 Dress, and Source 2 Noise Level, and only including rows for which Calculated Dollar Cost is available according to one embodiment.

FIG. 9B shows a missing data pattern table for a prospective model of calculated dollar cost using three attributes from data source 2, plus three more attributes from source 4, according to one embodiment.

FIG. 9C is a missing data table showing pairwise presence of two predictor variables according to one embodiment FIG. 9D is another missing data table showing pairwise presence of two predictor variables according to one embodiment

FIG. 13A shows an example of a one-variable categorical model according to one embodiment.

FIG. 13B shows a similar categorical model as FIG. 13A, but with an additional column, coded as NA, that has been added to account for missing data according to one embodiment.

FIG. 14A shows a joint categorical model of dollar cost estimates based on two predictor variables, Cost and Fast Food, according to one embodiment.

FIG. 14B shows a similar joint categorical model to that of FIG. 14A where NA level coding has been used for both variables, Cost and Fast Food.

FIG. 15 shows an exemplary data table that might be generated from the iterative process to calculate adjusted dollar cost shown in FIG. 12 according to one embodiment.

DETAILED DESCRIPTION OF THE INVENTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalents; it is limited only by the claims.

Numerous specific details are set forth in the following description in order to provide a thorough understanding of the invention. However, the invention may be practiced according to the claims without one or more of these specific details. For the purpose of clarity, technical material that is known in the technical fields related to the invention has not been described in detail so that the invention is not unnecessarily obscured. Furthermore, while the exemplary embodiments illustrated herein show various components of the system collocated, it is to be appreciated that the various components of the system can be located at distant portions of a distributed network, such as the Internet, LAN, WAN or within a dedicated secured, unsecured, and/or encrypted system.

Thus, it should be appreciated that the components of the system can be combined into one or more devices, or split between devices. As will be appreciated from the following description, and for reasons of computational efficiency, the components of the system can be arranged at any location within a distributed network without affecting the operation thereof.

Furthermore, it should be appreciated that the various links and networks, including any communications channel (s) connecting the elements can be wired or wireless links or any combination thereof, or any other known or later developed elements(s) capable of supplying and/or communicating data to and from the connected elements. The term module as used herein can refer to any known or later developed hardware, software, firmware, or combination thereof, which is capable of performing the functionality associated with that element.

Figure 1:
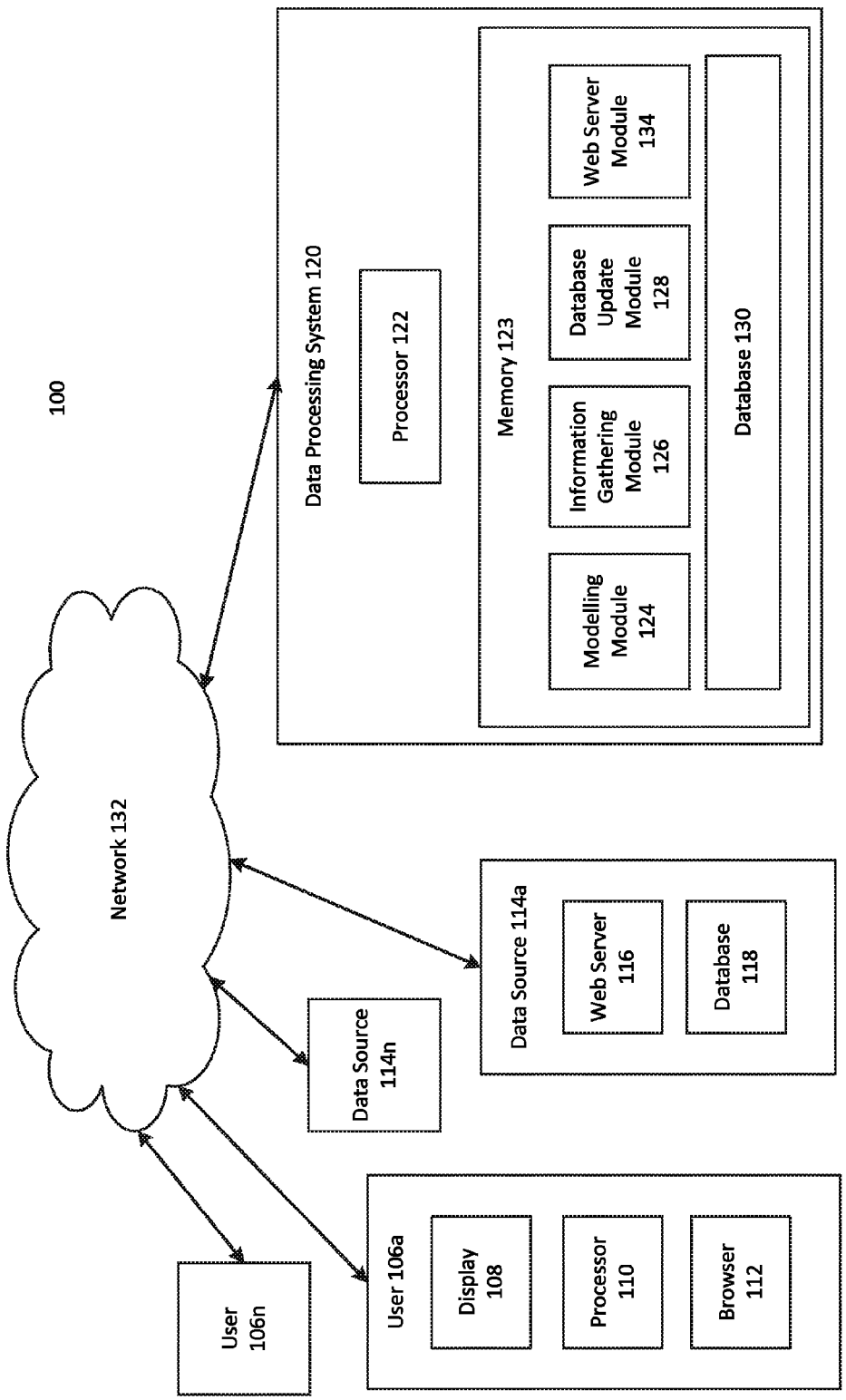
FIG. 1 shows an exemplary system architecture according to one embodiment.

FIG. 1 shows an exemplary system architecture 100 according to one embodiment. FIG. 1 includes a plurality of data users 106*a* . . . 106*n*, data sources 114*a* . . . 114*n*, a data processing system 120, and a network 132. Data processing system 120 or its components can be any appropriate data processing system including but not limited to a personal computer, a wired networked computer, a wireless network computer, a networked server, a wireless network server, a mobile phone or device containing a mobile phone, a hand-held device, a thin client device, some combination of the above, and so on. As would be apparent to anyone of ordinary skill in the art, each of these devices has a processor, computer readable memory coupled to the processor, a network interface coupled to the processor, and software stored in the computer readable memory and executable by the processor. Data processing system 120 may include any number of known input and output devices such as a monitor, keyboard, mouse, etc. Data processing system 120 may be configured to interact with data sources 116 through network 132. Network 132, which can be any network that allows communication between one or more of the data sources 116, data processing system 120, and user 106. For example, network 132 can be but is not limited to the Internet, a LAN, and WAN, a wired network, a wireless network, a mobile phone network, a network transmitting text messages, or some combination of the above.

The data sources 114 can be a database, web service, website, server, or any other information resource. In one embodiment, data sources 114 have, but are not limited to, web servers 116 interacting with database 118 and hosting websites for interaction with data processing system 120. The data resource 114 can be internal to, or external to the data processing system 120. In one implementation, data sources 114 may interact with data processing system 120 that accepts user queries via network 132 with information pertaining to entities such as, for example, restaurants or hotels, and return webpages based on queries and by retrieval of information from database 118. Examples of such data sources 114, are websites zagats.com and yelp.com. Data gathered from data sources may be structured or unstructured.

User 106 can be any type of computer including, but not limited to, a desktop, laptop, mobile phone or server. In a one embodiment, user 106 includes a display 108, processor 110 and browser 112. Browser 112 can be any type of application configured to communicate over a network, for example by http or ftp protocol, and displaying on display 108 web pages, documents, or other information. Example browsers 112 include Internet Explorer®, Chrome®, Safari®, and Firefox®. In one embodiment, browser 112 could part of an app or application specifically designed to communicate on a personal computer or mobile device over Network 132 with a website or web service hosted on Data Processing System 120 to obtain and display data such as that described in this patent.

In a one embodiment, data processing system 120 includes a processor 122 and memory 123. Stored in memory and processed by the processor 122 are a modeling module 124, an information gathering module 126, a database update module 128, a web server module 134, and a database 130. In one implementation, the modeling module 124 is responsible for performing calculations on retrieved data stored in database 128 or otherwise stored in memory 123 including modeling of predictor variables versus calculated dollar costs, generating predictions based on those models, and passing results to database update module 128. Each of these functions is described in detail below. In some implementations, modeling module 124 uses programming languages such as R and Python and/or software such as SAS or MATLAB to perform these functions, but there are many other combinations of programs, scripts and API's that could be used in different implementations.

In one implementation, the information gathering module 126 is responsible for obtaining information from data sources and passing the information to the database update module 128. In this implementation, information gathering module 126 may communicate with and gather information from data sources 114 using a network connection to network 132 between data processing system 120 and data sources 114. The process of obtaining the data could take various forms in different embodiments. In different implementations, information could be entered into database 130 by information gathering module 126 manually, scanned from printed form, taken directly in whole or in part from an existing database, gathered from an API (application programming interface), or by analyzing data sources 114 that are websites. In some implementations, the information gathering module 126 might use programming languages like R, Python, C++, Perl, etc. to gather information from such sources.

In one implementation, the database update module 128 is responsible for updating database 130 periodically as is also described in more detail below. In some implementations the database update module uses MySql to manage the database, but other programs are available to perform the necessary functions described herein. In different implementations, database 130 contains structured data, each entry having one or more data attributes (such as name, address, status, etc), or unstructured data such as emails or articles. In different embodiments, database 130 can be a relational database such as SQL or Oracle or a non-relational or object oriented database such as NoSQL or MongoDB but other types of databases could be used to store similar data.

In one embodiment, web server module 134 is any app or application configured to communicate over Network 132, for example by accepting http or ftp protocol requests from user 106 and generating webpages, documents, or other information and sending them back to user 106 using the same or similar protocols. In one implementation, data processing system 120 hosts a website or web service generated by web server module 134 over network 132.

Modeling module 124, information gathering module 126, database update module 128, web server module 134, and database 130 are all shown in FIG. 1 as being in a single memory 123, although, in different embodiments, a large collection of data as well as programming may be stored in many ways, including but not limited to distributed data processing systems, cooperating data processing systems, network data processing systems, cloud storage and so on.

It will be understood and appreciated by those of ordinary skill in the art that the computing system architecture 100 shown in FIG. 1 is merely an example of one suitable computing system and is not intended to suggest any limitation as to the scope of the use or functionality of the present invention. Neither should the computing system architecture 100 be interpreted as having any dependency or requirement related to any single component/module or combination of component/modules illustrated therein. It will be appreciated by one skilled in the art that the named modules 124, 126, 128, and 134 in data processing system 120 could be formed in any combination with different naming conventions, and the programming and the data processing functions described herein as being part of a specific module 124, 126, 128 and 134 could be part of any named module using any type of programming language or software package functioning at various levels of abstraction to perform the same functions as modules 122, 126, 128 and 134 in different embodiments of the invention. Modules 122, 126, 128 and 134 are disclosed to assist the reader in understanding that particular data processing functions are often performed using distinct software or programming languages within system memory 123, and can take many different forms in many different embodiments of the invention. As such, modules 122, 126, 128 and 134 should not be considered to limit the invention as claimed even where aspects of embodiments of this invention are described as being implemented by a specific software modules 122, 126, 128 or 134.

The following definitions are meant to create uniformity and aid the reader in understanding the invention. The reader should understand, however, that the definitions provided below are not meant to be limiting in the sense that the meanings of the terms will be enhanced based on usage of the terms in the disclosure.

As used herein, "dollar cost" is a cost expressed in dollars relating to entities as obtained directly from one or more data sources 114 and stored in database 130 without modification.

"Calculated dollar cost" is a cost that is calculated based only on dollar costs obtained from one or more data sources 114. In a one embodiment, calculated dollar costs are calculated as a weighted average of the available dollar costs. In other embodiments, calculated dollar cost might be calculated non-linearly. In the event that only a single set of dollar costs corresponding to a set of entities was obtained from only a single data source 114, then the calculated dollar cost would, in a one embodiment, simply be set as equal to that dollar cost for each entity in that set.

A "predictor variable" is an attribute of an entity in a database that is not a dollar cost but that can be used to make predictions of cost based on statistical modeling methods using, as the independent variable, the values of that attribute for a set of entities, as the dependent variable, the associated dollar costs for that set of entities such as, for example, calculated dollar cost or adjusted dollar cost. Examples of predictor variables are ratings of food quality for restaurants or locations of hotels.

"Joint modeling" refers to the practice of creating a statistical model using more than one independent variable to predict a single dependent variable.

"Individual modeling" refers to the practice of creating a statistical model using exactly one independent variable to predict a single dependent variable.

A "group" is defined as a set of one or more predictor variables or the predictions of cost from the predictor variable's individual models. The predictor variables or predictions based on the predictor variable's individual models in each group will be used together in a joint model as independent variables with calculated dollar cost or adjusted dollar cost as the dependent variable and dollar cost estimate as the prediction that results from the joint model. In general, if groups are stated to be based on a predictor variable or on the predictions of their individual models, it can be assumed, unless the context implies otherwise, that the two definitions are interchangeable. Methods of determining the set of predictor variables that form a group will be explained in more detail with reference to specific embodiments.

The "dollar cost estimate" is a prediction of cost expressed in dollars that is generated from individual or joint models using, as the independent variables, one or more predictor variables for a set of entities with, as the dependent variable, the associated costs expressed in dollars for that set of entities, such as, for example, the calculated dollar costs or adjusted dollar costs. In one implementation, the dollar cost estimate is derived from such models for all entities that have dependent variables available as well as entities that do not have dependent variables available but that do have values for at least one independent variable available. The method of obtaining dollar cost estimates will be described in more detail with reference to specific embodiments.

The "adjusted dollar cost" is a representation of the cost of an entity taking into account dollar costs and predictor variables obtained from data sources. In one embodiment, it is meant to provide as accurate and precise an estimate of the cost of typical purchase from an entity and is meant to be comparable relative to all entities of a given type for which adjusted dollar cost is available. Using restaurants as an example of a type of entities, an adjusted dollar cost might represent the cost of a typical meal, including tax, tip and beverage. In a one embodiment, adjusted dollar cost is obtained from an iterative process, whereby, in each iteration, adjusted dollar cost is obtained from a calculation such as, for example, a weighted average based on either the calculated dollar cost and the dollar cost estimate for entities that have this information available or the dollar cost estimate alone for entities that do not have calculated dollar cost information available. In this same or other embodiments, adjusted dollar cost can be iteratively substituted for calculated dollar cost as the dependent variable in modeling dollar cost estimates allowing for the calculation of updated adjusted dollar costs with each iteration of modeling dollar cost estimates for successive groups.

"NA level coding" refers to the practice of treating categorical variables, i.e., variables that take on one of a finite set of values, with missing data as if they had an extra category and no missing data. FIG. 13B and FIG. 14B, discussed in more detail below, provide examples of NA level coding.

Figure 2:
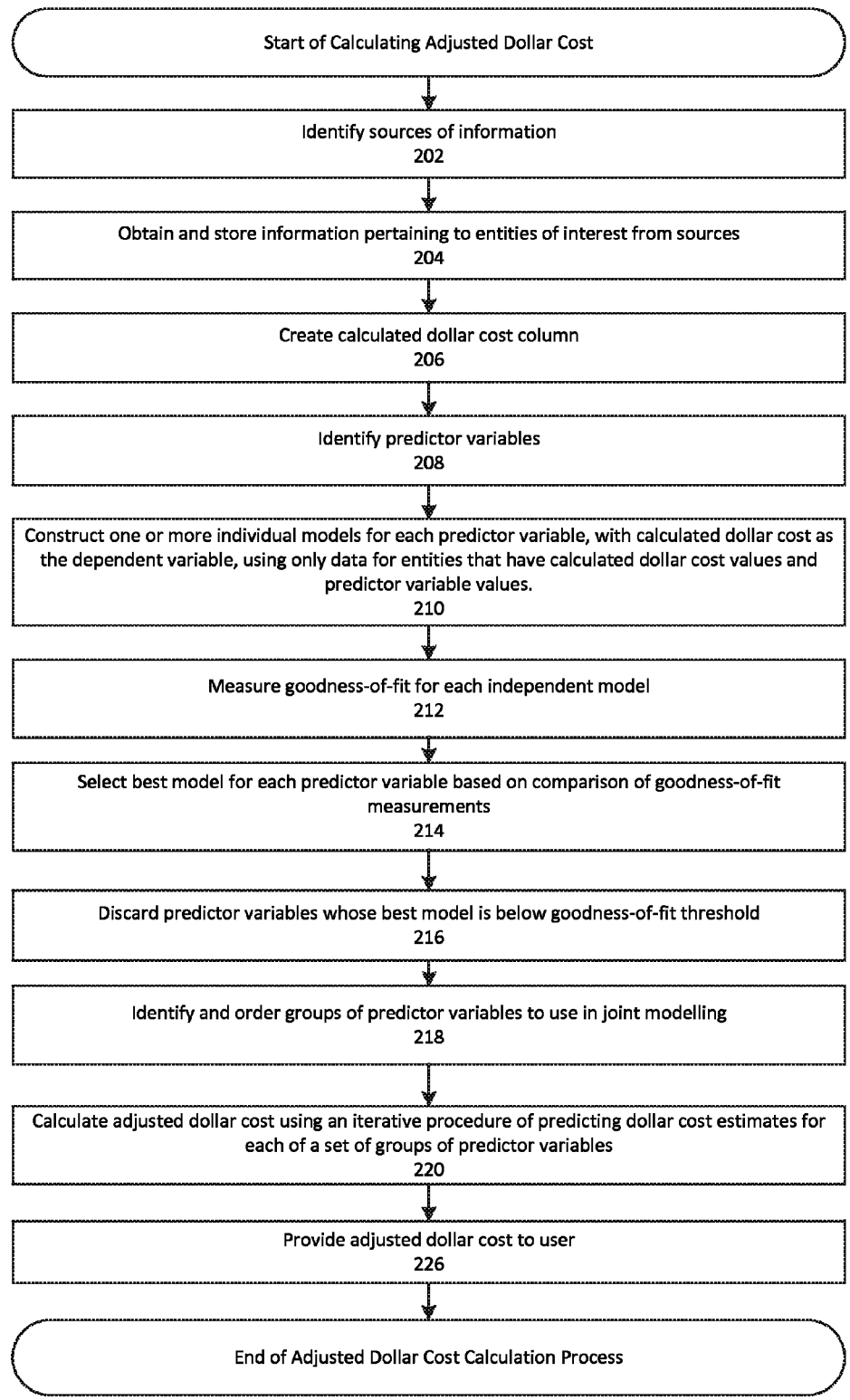
FIG. 2 shows a flowchart reflecting the process of calculating the adjusted dollar cost based on information gathered from one or more data sources according to one embodiment.

FIG. 2 shows a flowchart reflecting the process of calculating the adjusted dollar cost based on information gathered from one or more data sources 114 according to one embodiment. In one implementation, the steps of the flowchart in FIG. 2 are carried out at least in part on server data processing system 120 by programmed applications in the modeling module 124, information gathering module 126, database update module 128, web server module 134, and database 130. The aim of FIG. 2 is to calculate the most accurate possible numerical estimate of cost for an entity based not just on the dollar costs obtained from the original data sources 114 but from all data obtained from data sources 114 that is useful in predicting cost.

The process begins in step 202 with information gathering module 126 identifying data sources 114 that contain information pertaining to entities of a particular type, e.g., restaurants or hotels. In one implementation, information gathering module 126 may be programmed to identify data sources 114 with information of interest by performing searches on search engines for websites with pertinent information relating to a type of entities. In a one implementation, information gathering module 126 identifies data source 114 by, in part, following hyperlinks programmed into information gathering module 126. In another implementation, information gathering module 126 identifies data source 114 by in part following hyperlinks programmed into information gathering module 126 and then performs searches for other sites containing information about to the same entities as those available in the first set of data sources 114. In still another implementation, information gathering module 126 may be programmed to search for information matching certain entities and then identify data sources 114 with information for all entities on any sites it locates.

In step 204, one or more information pertaining to entities of interest available on data sources 114 is obtained by information gathering module 126 and stored in database 130 by database update module 128. In a one implementation, each different type of information gathered from data sources 114 is stored in database 130 as distinct attributes forming single records for each entity that appears in at least one of data sources 114. If, for example, three websites each provide dollar costs for the same restaurant, each dollar cost would be stored as the value of a distinct attribute for each of the three source websites. The same would be true for every other attribute obtained from the websites. The process of obtaining the data could take different forms in different implementations. Information could be entered into a database manually, scanned from printed form, taken directly in whole or in part from an existing database, gathered from an API, or gathered by analysis of webpages. In a one implementation, information gathering module 126 obtains data through network 132 by analyzing data sources 114 that are websites and retrieving all available information about the entities of interest from data sources 114. In another implementation, information gathering module obtains data through network 132 by analyzing data sources 114 and retrieving only predefined types of information about entities of interest such as the names of entities, their dollar costs, and predictor variables.

After step 204 is completed, database 130 should, in some implementations, contain a mass of data relating to a large set of entities as compiled from one or more data sources 114 by information gathering module 126 and stored by database update module 128. In some implementations, database 130 will contain information that is incomplete, conflicting, and/or inexact due to the nature of information available from data sources 114. FIG. 3 shows a data table with a portion of data that database 130 might contain after step 204 according to one embodiment. In practice, the amount of data and number of attributes gathered will likely be much greater than that shown in the data table. In this particular embodiment, each row corresponds to a restaurant identified by a unique Restaurant ID. There are columns of data from four different data sources 114, identified by number. In practice, the sources would likely be identified by name such as Zagats.com of Yelp.com. Each column contains predictor variables with the exception of Source 1 Cost, which is a dollar cost reflecting the cost of the entities according to source 1. The attribute Source 1 Cost is a dollar cost while the other three sources have only predictor variables that are categorically encoded dollar signs, $, $$, $$$, $$$$. Attributes such as Source 1 Fast Food are considered predictor variables, because they are well known to have a correlation to dollar cost and/or a correlation to dollar cost can be mathematically determined. A fast food restaurant, for example, would often have a lower dollar cost per meal than a restaurant considered as fine dining. Predictor variables such as Source 1 Fast Food will be useful in predicting dollar cost estimate, and ultimately calculating the adjusted dollar costs of the restaurants. Information from different sources may or may not be consistent for a given restaurant. For example, restaurant r000108 has a Source 2 Cost of $$, but a Source 3 Cost of M. In addition, values used for the Dress attributes from different sources are not consistent between the sources. For example, restaurant r000206 has a Source 1 Dress of Upscale Casual, a Source 2 Dress of Casual, a Source 3 Dress of Casual dressy, and a Source 4 Dress of Smart Casual. Four additional attributes, Source 1 Fast Food, Source 3 Delivery, Source 1 Takeout, and Source 2 Takes Reservations, provide examples of logical fields, which can assume the values TRUE or FALSE.

In step 206 of FIG. 2, modeling module 122 calculates the calculated dollar costs for any entities that have at least one dollar cost value in its record, and database update module 128 stores the calculated dollar costs in a new column in database 130. In a one implementation, calculated dollar costs are calculated as a weighted average of the available dollar costs. In other implementations, calculated dollar cost might be calculated non-linearly. In some implementations, there is no dollar cost information available for some entities despite other information relating to those entities having been obtained from data sources 114 in step 204. In these implementations, no calculated dollar cost will be generated for those entities, but it still may be desirable to generate cost information pertaining to those entities, which is one of the goals of calculating adjusted dollar cost using the process of FIG. 2, that is, calculating adjusted dollar cost for entities that have no dollar cost values available from data sources 114 in addition to calculating adjusted dollar cost for entities that do have dollar cost values. The process for calculating adjusted dollar cost for entities that have no dollar cost data available from data sources 114 will be discussed in greater detail with reference to embodiments in later figures.

In step 208, modeling module 124 identifies predictor variables in database 130. In one implementation, this is accomplished by examination of predictor variables and selecting only those with data that is likely to result in a good correlation between predictor variable and cost. If, for example, an attribute in database 130 relates to whether a restaurant serves fast food, an informative and useful model is likely possible between that attribute and dollar cost and it will be selected as a predictor variable. If, on the other hand, a text or categorical attribute has too wide a range of possible values, such as the name of the restaurant or the type of food, including it in subsequent steps may result in unreliable models, and ultimately unreliable adjusted dollar costs. In different implementations, identifying predictor variables can be accomplished by human identification or by software in modeling module 124 that is programmed to identify attributes with desirable qualities such as particular data types or a limited range of values. In a one implementation, modeling module 124 is programmed to rule out attributes with too wide an array of values such as might be the case with a column of restaurant names. Doing this programmatically, for example, by counting the number of unique values of an attribute and eliminating those that exceed a certain reasonable threshold, can be very efficient in the event that there are hundreds of attributes in database 130, each of which are a potential predictor variable. In one implementation, human identification of certain aspects of the predictor variables, such as whether the categories of a variable should be considered ordered (as in step 514), is performed first, and then the entire database 130 can be handled programmatically without further human intervention. In another embodiment, an initial human identification of subjective predictor variables is performed, in which predictor variables that encode subjective information about entities, such as user ratings or satisfaction, are excluded from consideration, and only the remaining objective predictor variables are retained for subsequent calculations. In another implementation, modeling module 124 is programmed to consider every attribute a predictor variable, but as just noted, this would increase the resources used for modeling adjusted dollar cost.

In step 210, modeling module 124 constructs one or more independent models of calculated dollar cost for each predictor variable using only data for entities that have values for the predictor variables of interest and dollar costs available. The predictions of these models are dollar cost estimates. Entities that do not have a dollar cost or the predictor variable of interest available are not used in the construction of the individual models. To the extent that deletion of such entities from the construction of individual models at this point creates a bias, that bias is minimized by subsequent steps in the process of FIG. 2 as will be addressed in more detail later.

Although at least one model will be constructed for each predictor variable in step 210, it is desirable to calculate multiple models based on different statistical methods and determine which model is the best. Depending on the type of data of which the predictor variable consists, different statistical methods are used to model the relationship between the predictor variable and calculated dollar cost. In general, the types of data are of the location type such as zip codes or a latitudes and longitudes, of the numeric type containing integer or floating point values, of the logical type containing True/False or Yes/No data, or the character type that assumes a limited number of values, in other words a "categorical" field. An example of a character/categorical type of data that night be used as a predictor variable is a dress code attribute for a group of restaurants, which might assume values such as Casual, Upscale, and Jacket Required. Depending on the data type and other factors, models that might be constructed for each predictor variable could be one or more non-linear 2-dimensional models, discrete categorical models, linear models, or non-linear models.

In step 212, modeling module 124 measures the goodness-of-fit for each individual model. The goodness-of-fit is derived from a plurality of statistical measures that quantify how well predictions match the predicted for a given model. In one implementation, goodness-of-fit is measured using the standard statistical coefficient of determination, $R^2$. In a second implementation, goodness-of-fit is measured using Adjusted $R^2$, which compensates for the effect of increasing the number of predictor variables. In a third embodiment, goodness-of-fit is measured using the F-test, which allows for the use of weights in measuring the accuracy of the model, which might be desirable when some entities are deemed more important than others. There exist many statistical analysis software packages that can provide goodness-of-fit measures and that can be incorporated into modeling module 124.

Next, in step 214, modeling module 124 uses the goodness-of-fit measurements for each model to determine which individual model is best for each predictor variable. Essentially, in this implementation, the model with the best (by convention the best is usually the highest) goodness-of-fit is selected. The end result of step 214 is that there is a single best-fit model for each predictor variable. All less attractive models are discarded.

In step 216, a threshold goodness-of-fit level as programmed into modeling module 124 is applied to determine if the best model selected for each predictor variable in step 214 is good enough to provide a useful correlation between the predictor variable and cost. In other words, step 216 involves a determination of whether the data for a given predictor variable fits a model well enough that it can reliably predict a dollar cost estimate. Therefore, in one implementation, if the goodness-of-fit of the model falls below the threshold value, that model and that predictor variable are not used in subsequent predictions of dollar cost estimates.

Steps 210 through 216 are described in greater detail with reference to the process in FIG. 5, and steps 214 and 216 are described by example with reference to FIG. 6.

In step 218, modeling module 124 identifies groups forming complete cases. Complete cases are those in which multiple attributes with all data available for the same entity have each been determined via steps 212 through 216 to be predictor variables with useful models correlating the predictor variables to calculated dollar costs. In one implementation, identification of complete cases is done by source. The best model for each predictor variable is then utilized to associate that predictor variable's values with calculated dollar cost. For example, if a the database 130 has an attribute relating to a restaurant' food quality, and the values for the attribute are a set of star ratings ranging from one star to five stars, the average cost of all restaurants with a particular star rating can be used to create a new attribute in database 130 that is the cost associated with each star rating. After this simple categorical model is created, the star rating of a restaurant can be used in combination with other predictor variables to create a restaurant's dollar cost estimate. In step 218, modeling module 124 identifies groups to use in joint modeling, selecting from among the predictor variables remaining after steps 212 through 216. These groups are determined based on the availability of data for the various entities within the predictor variables so that joint modeling can occur using predictor variables that have similar data availability. These groups may often correspond to the data sources, e.g., all the predictor variables from Source 1 may form a group together. Step 218 is discussed in greater detail with reference to the process in FIG. 10.

In step 220, modeling module 124 uses an iterative process to determine adjusted dollar cost by jointly modeling dollar cost estimates using each group of predictor variables, and database update module 128 stores dollar cost estimates in database 130. In one implementation, modeling module 124 sets the adjusted dollar cost equal to dollar cost estimate for all entities where calculated dollar cost is missing and database update module 128 stores the adjusted dollar cost in database 130. In one implementation, modeling module 124 calculates the adjusted dollar cost equal to a blend of calculated dollar cost and one or more dollar cost estimates for all entities where calculated dollar cost is not missing, and database update module 128 stores the adjusted dollar cost as a new column in database 130. In one implementation, the adjusted dollar cost will equal an average of the calculated dollar cost and the dollar cost estimate. In another implementation, such as that described in FIG. 12, modeling module 124 iteratively calculates updated adjusted dollar costs based on successive modeling of dollar cost estimates for each new group of predictor variables, then using the resulting adjusted dollar cost as the independent variable instead of calculated dollar costs after the first iteration for the following groups. In the event that there are no predictor variables available to model an adjusted dollar cost for a given entity, then adjusted dollar cost would by default equal the calculated dollar cost. In one implementation, in the event that there is no calculated dollar cost nor any predictor variables available for an entity, then the entity's adjusted dollar cost value would remain unavailable.

Figure 12:
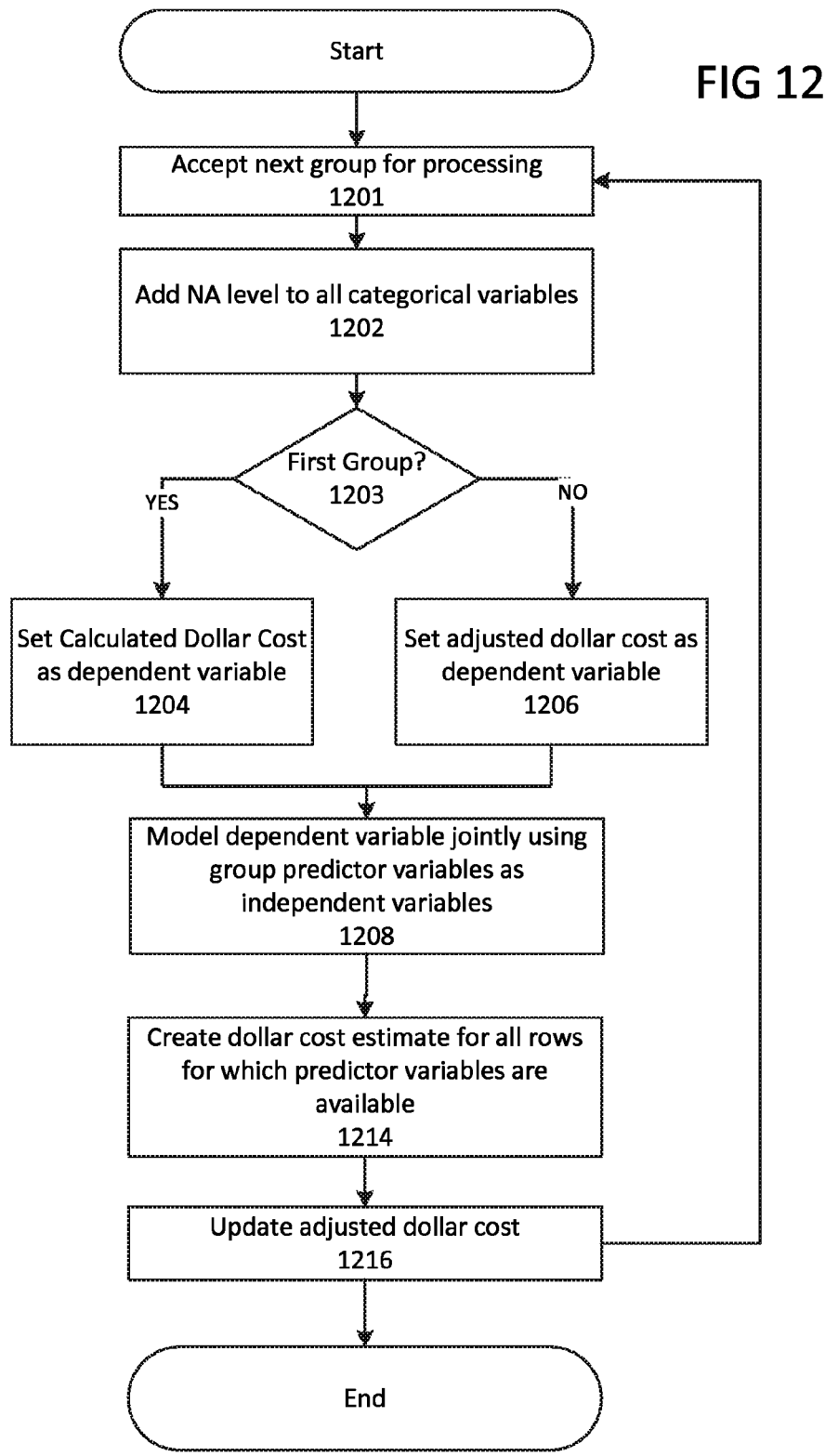
FIG. 12 shows a process of how groups are individually used resulting in an iterative process of predicting dollar cost estimates and updating adjusted dollar cost according to one embodiment.

In one implementation, a weighted average of dollar cost estimates and calculated dollar cost (or adjusted dollar cost after the first iteration of the process in FIG. 12) based on, for example, source reliability weights could be used to calculate adjusted dollar cost. Sources may be more or less reliable based on a number of factors that could be calculated based on information obtained from data sources 114. For example, sources with a higher number of users could be weighted more heavily than sources with fewer users based on the concept that more users would make user ratings more reliable from specific sources. In one implementation, source weights could also be based on the amount of data available in a particular source relative to another source. In one implementation, source weights are determined based on external considerations, such as perceived prestige or reputation. In one implementation, source weights are based on the goodness-of-fit for models produced from their predictor variables.

In another implementation, it is possible to specify a set of weights for multiple dollar cost estimates to be used to calculate the adjusted calculated dollar cost. These weights might be determined based on subjective estimates of the importance or reliability of data sources 114 and/or on objective measures such as the number of user reviews available in data sources 114. In the following equations, the weights $w_j$ for each dollar cost estimate are specified for data sources 114, and $w_{dc}$ is the weight of the dollar cost estimate. The following equations deal with the availability of the values used to calculate adjusted dollar cost. When calculated dollar cost is available:

$$\text{Adjusted Dollar Cost} = \frac{\left(\sum_j w_j DollarCostEstimate_j\right) + w_{dc} CalculatedDollarCost}{\left(\sum_j w_j\right) + w_{dc}} \quad (1)$$

$$j \in (i \mid DollarCostEstimate_j \neq NA) \quad (2)$$

When calculated dollar cost is not available:

$$\text{Adjusted Dollar Cost} = \sum_j w_j DollarCostEstimate_j \Big/ \sum_j w_j \quad (3)$$

$$j \in (i \mid DollarCostEstimate_j \neq NA) \quad (4)$$

In both cases, when neither calculated dollar cost nor any dollar cost estimate is available, then adjusted dollar cost is NA.

Step 220 tackles one of the biggest challenges in dealing with data from multiple sources, which is that most typical joint modeling techniques require complete cases, that is, only entities with complete data for every predictor variable are included in the analysis. Step 220 is described in more detail with reference to FIG. 12.

In step 226, adjusted dollar costs are provided to the user 106. In this implementation, adjusted dollar costs are provided to user 106 by web server module 134 of data processing system 122 over network 132. In another embodiment, the adjusted dollar costs are provided to the user on a display connected to data processing system 120.

FIG. 4 shows a data table that a database 130 might contain following the completion of the process in FIG. 2 according to one embodiment. The table in FIG. 4 contains the same data as the table in FIG. 3, but, as a result of the process in FIG. 2, three additional columns have been added to the right of the Restaurant ID column, which are Adjusted Dollar Cost, Dollar Cost Estimate, and Calculated Dollar Cost. The Calculated Dollar Cost and Dollar Cost Estimate columns were added to the table in order to generate the Adjusted Dollar Cost column. In this embodiment, the table in FIG. 4 contains information about restaurants. It is difficult for a user using only the information in FIG. 3 to decide which restaurant to visit given the sheer amount of data available from the sources, especially given that FIG. 3 represents a small example of the amount of data that would be obtained in practice during the data gathering step 204 of FIG. 2. By generating the Adjusted Dollar Cost column of FIG. 4, the users can use a single column mathematically generated based on all the information available in FIG. 3 to compare the restaurants in a much less cumbersome manner and perhaps make a better-informed decision. It is, therefore, desirable to have reliable cost information for all the restaurants including those for which no dollar cost information was obtained from any data source 114. The Adjusted Dollar Cost column addresses this problem and is intended to enhance the ability of users to review the data such as that in FIG. 4 as opposed to FIG. 3 to make an easier and better-informed selection of a restaurant to visit.

FIG. 4 represents a specific embodiment with particular characteristics. First, although there is cost information from four different sources in attributes Source 1 Cost through Source 4 Cost, the values for Calculated Dollar Cost are the some as the numerical costs provided in Source 1 Cost. The cost attributes from sources 2 through 4 have range-coded information, which is not used to determine calculated dollar costs. If, however, more than one numerical cost column were available, presumably from different sources, Calculated Dollar Cost could be the result of a calculation based on the plurality of dollar costs from a plurality of data sources.

Second, very few rows have no missing data (missing data is indicated as NA). The mechanism for handling missing data such as appears in this example will be discussed in depth below. Here, data availability is generally grouped by source. For example, cost and dress data from a given source are generally either present or absent, e.g., the Source 3 Cost and Source 3 Dress attributes are both either NA or not for a given entity.

Third, the Dollar Cost Estimate is calculated using only objective predictor variables. Objective predictor variables are those that describe aspects of the entities that are facts, or at least can be generally agreed upon, rather than a subjective opinion. Non-limiting examples of objective predictor variables include all the columns to the right of Calculated Dollar Cost shown in FIG. 4, or information about an entity's location. Subjective predictor variables are typically user ratings of the entity, such as Food Rating, Service Rating, and Décor Rating, or Prime Location. In this embodiment, the data shown in FIG. 4 only contains objective predictor variables, meaning that only objective predictor variables were used to calculate adjusted dollar cost. In some embodiments, subjective predictor variables are excluded from the calculation of dollar cost estimate to preserve the understanding of the value of the entity. In other words, subjective predictor variables are excluded to keep the adjusted dollar cost grounded on factual basis. In such cases, it may be important to avoid distorting the dollar cost estimate for entities that may be popular or unpopular because of the perceived quality of what they provide relative to the price they charge. For example, an inexpensive restaurant delivering a dining experience that is perceived as being a good value is likely to receive higher user ratings than a similar restaurant with identical prices that delivers a lesser experience. Although in general it is true that subjective ratings are often correlated with price it could be a mistake to estimate that the prices of the first restaurant in the example above are higher than those of the second. The differences in calculating adjusted dollar cost based only on objective or subjective predictor variables or both types of predictor variables may provide value to a user interested in a particular basis for adjusted dollar cost. Dollar cost estimate is usually similar to calculated dollar cost in cases where calculated dollar cost is available, as would be expected from the fact that dollar cost estimate is fitted on calculated dollar cost.

Fourth, it can be observed that Adjusted Dollar Cost values are now available for every entity including ones that initially had no calculated dollar cost value. The Adjusted Dollar Cost value is often, but not always, similar to calculated dollar cost in rows for which calculated dollar cost is known. A few examples where Adjusted Dollar Cost is not close to calculated dollar cost are rows r000031, where calculated dollar cost is $53 but Adjusted Dollar Cost is $64.24, and r000033, where calculated dollar cost is $74 but Adjusted Dollar Cost is $94.37. This disparity is caused by the inclusion of Dollar Cost Estimate in the calculation of the Adjusted Dollar Cost for these entities. An examination of the Source Cost 2-4 columns reveals that these other sources have high range estimates for cost, which has resulted in the higher values for Dollar Cost Estimate. Then, when Adjusted Dollar Cost is calculated as the average of calculated dollar cost and Dollar Cost Estimate, the result is the observed difference between Calculated Dollar Cost and Adjusted Dollar Cost. Thus, in this embodiment, the end result of the process in FIG. 2 is the generation of an adjusted dollar cost based on a novel means of modeling calculated dollar cost as the dependent variable on predictor variables as the independent variables not only to fill in unavailable cost data but also to improve the cost data that is available. In the embodiment presented in FIG. 4, the Adjusted Dollar Cost is calculated as the simple average of Calculated Dollar Cost and Dollar Cost Estimate when calculated dollar cost is available, or is equal to Dollar Cost Estimate where Calculated Dollar Cost is not available. Many entities have no calculated dollar cost associated with them. This is typically the case even when dollar cost data is available from many different data sources 114 for different entities. Adjusted dollar cost can still be calculated for those entities through the use of iterative joint modeling as explained below.

Finally, for the purposes of simplification, the table in FIG. 4 contains only one column of dollar cost estimates and adjusted dollar costs. As will be shown with reference to FIG. 12, the iterative process of FIG. 2 might generate a successive set of dollar cost estimate columns and adjusted dollar cost columns as each group is used to iteratively model adjusted dollar cost. Here, it can be assumed that FIG. 4 displays a last snapshot of that iterative process outlined in FIG. 2 and FIG. 12, where the Dollar Cost Estimate has been derived from the various predictor variables using successive groups. The Adjusted Dollar Cost column shown is the final one, which has resulted from the iterative process described in more detail with reference to FIG. 12 and FIG. 15.

FIG. 5 shows a flowchart for the individual modeling process for the purpose of selecting which predictor variables or their individual models will be used in subsequent groups according to one embodiment. As such, FIG. 5 provides additional disclosure regarding steps 210 through 216 from FIG. 2. In one embodiment, the process in FIG. 5 is automated using various computer scripting methods. In one embodiment, some steps, such as step 514, could optionally involve human determinations and data processing system 120 receives input regarding the determinations prior to a complete automated pass through all the available predictor variables.

There exist many widely available software packages that are capable of generating different types of statistical models as well as calculating goodness-of-fit that would be known to one of ordinary skill in the art with the present disclosure before them. For example, the statistical language R includes a mechanism for specifying the dependent and independent variables of a model, here each predictor variable and the dollar cost respectively, and generating and evaluating a wide range of linear and non-linear models. An automated modeling process is useful when dealing with databases that may have hundreds of possible predictor variables, which may be used individually or in combinations.

The process begins in step 501 by determining the type of data present in a single predictor variable from a set of predictor variable data 500 that is available on database 130. The data may be determined to be of the location type 502, logical type 503, categorical type 512, or numeric type 505. In one implementation, a software application can be written that examines the declared type of data in the database 130. Data in a database 130 may already be properly typed, that is, identified as containing character, logical, categorical, numerical, or location data. It may be the case, however, that data is not typed, i.e., the data consists of all character attributes. Although one skilled in the art of data analysis would generally be able to assign types to the attributes by inspection, it is useful to be able to assign types programmatically. The following pseudo-code is one embodiment of a type assignment function, operating on an attribute:

```
ImpliedType <- function(x,categoricalThreshold=20)                      (5)
{
# assign type to attribute x, based on its content
If x has 2 columns, with names "lat" and "lon"
    then return("location")
If all non-missing values of x are in
("Y","N","YES","NO","TRUE","FALSE")
    then return("logical")
If all non-missing values of x can be converted to numbers without
error
    then return("numeric")
U = (the number of unique values of x)
If U < categoricalThreshold
    then return("categorical")
otherwise
    return("character")
}
```

This pseudo code can be written in a number of suitable programming languages and uses to assign types in the database 130. Special cases might require slightly more complex but readily apparent code. For example, zip code data might be distinguished from ordinary numeric data by looking for attributes that were exactly 5 or 9 digits long.

If the data is of a location type 502, then a determination is made in step 506 as to whether the data is continuous 507 such as an exact location specified by latitudinal and longitudinal coordinates or coded data 509 such as zip code or neighborhood. Coded data 509 is fit to a discrete categorical model 511 such as a simple mean-estimation model to predict dollar cost estimates. As with all of the models discussed in FIG. 5, readily available statistical software packages are programmed and stored in modeling module 124 that predict dollar cost estimates. If the location data is continuous 507, then an attempt to encode the data 508 is made. If successful, then two routes are followed. First, the newly encoded data 509 is analyzed using a discrete categorical model 511. Simultaneously, the non-encoded version of the continuous data is analyzed using non-linear 2-dimensional model 510. Thus, multiple models may be evaluated using the same predictor variable.

Logical data 503, which by its very nature is discrete categorical data 521 is fit with a discrete categorical model 511. Categorical 504 data, however, can lead to three different types of models. With categorical data 504, a determination may be made by human inspection or programmatically as to whether the data has a natural order 514 such as $, $$, $$$, $$$$. If not, then only a discrete categorical model 511 is used. If the data has a natural order 515, then an attempt may be made to assign numerical values to the data 516. The non-numerical version of the data is then modeled discrete categorical data 511. If successful, the data is binned 517. Binning is a process whereby values in a certain range are considered to have the same value. For example, values in the range 0-30 might be assigned to 4 bins: 0-15, 15-20, 21-25, and 25-30, with each bin being assigned a single value. As this example makes clear, binning does not necessarily need to be on equally spaced intervals, or split the data into bins with equal number of entries. The purpose of binning is to improve the robustness and stability of a model, making it less sensitive to outliers. Binned numeric data is very similar to ordered categorical data. In the example just mentioned, if the bins are assigned values 1, 2, 3, and 4 then this is exactly equivalent to ordered categorical data with values 1, 2, 3, and 4. If the bins are assigned (non-linear) values such as 7.5, 17.5, 22.5, and 27.5 (corresponding to the average of their respective ranges) then modeling results will be slightly different. As another example, ordered categorical data such as $, $$, $$$, $$$$ representing the cost of a restaurant symbolically might be assigned arbitrary linear numeric values 1, 2, 3, and 4, or non-linear values such as 20, 35, 60, 100. The binned data 517 is then tested with linear 521 and possibly more than one non-linear model 520 such as the Loess model.

With numeric data 505 an attempt to bin the data 518 is made. The binned numeric data will be modeled both linearly 521 and non-linearly 520. The un-binned version in the form of continuous numerical data 519 can also be tested linearly 521 and with one or more non-linear models, which, as mentioned above, often result in better predictions of cost than linear models.

Following the generation of all possible models for each predictor variable, a goodness-of-fit value for each model is generated 522. Next, a determination as to whether one or more models have been generated is made. If multiple models have been generated 523, the best model is chosen by comparison of their goodness-of-fit values 524 and selecting that with the highest goodness-of-fit. Even after the best model is chosen, it may still be discarded 527 if its goodness-of-fit value falls beneath a threshold value 525. Similarly, if it is determined that only one model is generated 523, that model is also checked as to whether it meets the threshold value 525. In both cases, models that meet the threshold value are used in subsequent steps to calculate adjusted dollar cost. Notably, steps 524 and 525 weed out predictor variables whose models do not form good enough models of cost for subsequent calculations of adjusted dollar cost as per FIG. 2. In step 526, the predictor variable is retained for use in joint modeling for the purpose of calculating adjusted dollar cost for all entities. In another embodiment, rather than using the predictor variable, the prediction of the model in step 526, that is, the dollar cost estimate, is used in place of the predictor variable itself for subsequent calculations of adjusted dollar cost. In other words, rather than using the predictor variables themselves as the independent variables, the dollar cost estimate of each predictor variable's best model is used for the independent variables in the joint modeling of adjusted dollar cost. Use of either the predictor variable or the prediction of the predictor variable's individual model is included in the definition of "groups" provided above, and that should be understood for discussion of the use of groups with reference to later embodiments. In step 527, the predictor variable and its model are discarded, because they did not meet the goodness-of-fit threshold value in step 525.

FIG. 6 shows a table that exemplifies how the goodness-of-fit is applied to the modeled predictor variable data according to one embodiment. FIG. 6 consists of a table with a selection of predictor variables, all from the same source, their goodness-of-fit measures, and columns indicating of how steps 524 through 527 of FIG. 5 are applied to actual data. In this example, a selection of models based on a selection of predictor variables is shown. Multiple models have been generated for some predictor variables. For example, the predictor variable Source 2 Noise Level, which is a numerical attribute, has four different models associated with it. By contrast, the predictor variable Source 2 Takes Reservations has only one model, a categorical model, associated with it, because it can only assume the values TRUE or FALSE. For each model, a Goodness of Fit value is shown, where higher values indicate a better fit. The Goodness-of-Fit threshold has been set to 0.3 in this example. This results in a total of three models generated from three out of the four predictor variables being selected for use in subsequent calculations of adjusted dollar cost. Of the four models associated with the predictor variable Source 2 Noise Level, the best is the non-linear model with a goodness-of-fit value of 0.29, which is lower than the threshold value of 0.3. Accordingly, all four models are discarded. Of the three models associated with the predictor variable Source 2 Dress, the best is the categorical model, and its goodness-of-fit level is also above the threshold value. Of the three models associated with the predictor variable Source 2 Location, the best model is the categorical model based on neighborhood, but the goodness-of-fit for this model is only 0.24, below the threshold of 0.3. Therefore, no models for this predictor variable are included. The models for Source 2 Takes Reservations and Source 2 Has Garden each have no competitors, but only the categorical model for the predictor variable Source 2 Takes Reservations will be used, because the categorical model for the predictor variable Source 2 Has Garden, with a goodness-of-fit value of 0.17, is below the goodness-of-fit threshold. Any discarded attributes will no longer be considered predictor variables and their modeled predictions will be discarded as well.

The remainder of this patent specification focuses primarily on describing steps 218 through 220 of FIG. 2, which involve deciding on groups to utilize in the joint modeling (see FIG. 10 and FIG. 11) and how the iterative joint modeling process is used to calculate adjusted dollar cost for each group (see FIG. 12 through FIG. 15). FIG. 7 through FIG. 9, however, are presented both to help the reader understand the disadvantages of current approaches and to understand the benefits of the processes described as embodiments of this invention.

FIG. 7 through FIG. 9 show examples of missing data pattern tables according to various embodiments. In different embodiments, missing data tables can be generated by various software packages, such as the mice package in R. In the main part of these tables, values of 0 correspond to the absence of data, and values of 1 correspond to the presence of data. These tables provide very useful views of the implications of using predictor variables as independent variables together for the creation of a joint model. In the embodiment of FIG. 7, the missing data pattern is shown for Calculated Dollar Cost, plus five cost attributes drawn from five sources, Source 1 Cost, Source 2 Cost, etc., The availability of Calculated Dollar Cost is identical to that of Source 1 Cost, since in this example Calculated Dollar Cost is derived only from Source 1 Cost. The remaining cost attributes are categorical and thus were not used in the calculation of Calculated Dollar Cost. In this instance, the intention is to model Calculated Dollar Cost as the dependent variable, with the categorical cost attributes as the independent variables. Each row of the table corresponds to a unique pattern of data availability. The last three columns display information about each case for each row: the Number of Missing Values, which can range from 0 to 6; the Number of Cases that displays the given pattern of data availability; and the Percentage of Cases that each row represents of the total number of cases. For example, row 1 has a value of 1 for each of the six data columns, and as a result the number of missing values for this row is 0. These are the only complete cases. The number of cases that have this pattern is 79, out of a total number of cases of 14533. The very small number of complete cases is a good demonstration of why the techniques of this disclosure are so useful. A joint modeling of these fields using list deletion, that is, only including the complete cases, would only be able to operate on these 79 cases, or less than 1% of the cases. Whereas, embodiments of this invention described below can operate on 12843 cases (the sum of the cases in rows 1 through 26 of FIG. 7) or 88.4%.

In other embodiments, joint modeling is to model the cases from each of the rows separately. In other words, a possible approach is to create a model for calculated dollar cost for each row using only the attributes that are available for that row. For example, using the 14 cases from row number 2 of FIG. 7, one could create a model of calculated dollar cost based on Source 1 Cost, Source 2 Cost, Source 4 Cost, and Source 5 Cost. An inspection of the table, however, reveals that this approach will be highly impractical for this dataset, as the pattern of data availability is highly fragmented, with the number of cases in some rows being very small (under 100 cases), with the resulting models being highly unreliable. Another problem with using subsets of predictor variables in separate models is that it introduces estimation bias to the results, as it is likely in datasets of this type that data is missing not completely at random. In other words, whether or not data is missing may be affected by certain qualities of the entities. For example, the 79 complete cases of row number 1 might not be statistically representative of the entire database—an examination of the Calculated Dollar Cost for these 79 restaurants that appear in all five sources might reveal them to be much more expensive than the overall database average. Any approach to modeling that relies solely on list deletion potentially suffers from an estimation bias. Embodiments of this invention solve the problems of fragmented data and estimation bias by an iterative approach of this invention described below.

FIG. 8 shows the same data as FIG. 7, but with the rows re-sorted to better display the correspondences between the availability for specific sources. The table is sorted first by the respective source columns in numerical order. The added columns Cases Source 1, etc., show the aggregated number of cases from multiple rows. For example, the value of 3056 shown directly under Cases Source 1 indicates that there a total of 3056 cases that contain data for Source 1 Cost, which is the sum of the number of cases shown in rows 1 through 14. Similarly, the value 11477 below that corresponds to the sum of cases from rows 15 through 27.

Since Calculated Dollar Cost is unavailable for 11477 cases, or more than three quarters of the dataset, most of the Adjusted Dollar Costs generated (as shown in the examples of FIG. 4 or FIG. 15) will be based solely on Dollar Cost Estimates, as opposed to being partly based on Calculated Dollar Cost. Since dollar cost estimates are created from joint models it is crucial that these models are based on as much data as possible so as to be as accurate as possible. The row order in the table of FIG. 8 suggests a way to begin, as it can be observed that there are 2883 complete cases based only on data availability for Calculated Dollar Cost, Source 1 Cost, and Source 2 Cost using rows 1 through 8. The approach of this invention begins with these cases. As described below, embodiments of this invention are capable of dealing with such a dataset and minimizing estimation bias. In one embodiment of this invention, this problem is solved through the use of iterative stages of modeling with carefully selected and ordered groups. In this embodiment, the dependent variable will be replaced with a new variable resulting from the modeling performed in the previous iteration. FIGS. 9A, 9B, 9C, 9D and 10 explain the process of group selection and ordering according to different embodiments of the invention.

FIG. 9A shows a missing data pattern table for a prospective model of calculated dollar cost using three attributes from the same data source, Source 2 Cost, Source 2 Dress, and Source 2 Noise Level, and only including rows for which Calculated Dollar Cost is available according to one embodiment. Here, although there is some fragmentation of the data availability, in 92% of the cases there is no missing data, e.g., row number 1. This can be attributed to the fact that the data is derived from the same source, and therefore in most cases if there is any data for a given entity, most of the relevant attributes do in fact contain data. In one embodiment, a measure of how uniform the data from of a given source can be defined on a row of missing data table as follows:

$$RowUniformity_{ij} = \begin{cases} TRUE & \text{if all attributes in row } j \text{ from} \\ & \text{source } i \text{ have same value} \\ FALSE, & \text{if not} \end{cases} \quad (6)$$

Then a measure of the uniformity of the source is defined as:

$$SourceUniformity_i = \qquad (7)$$
$$\sum_j Cases_j / \sum Cases \text{ for } RowUniformity_{ij} = TRUE$$

Examining FIG. 9A, it can be seen that Uniformity Source 2 is TRUE for rows 1 and 2, because the values for the three attributes from Source 2 are all 1 in row 1 or all 0 in row 2. It will be observed that all the other rows feature various non-uniform combinations. The Source Uniformity of source 2 is calculated using the above formula to be 98.8%. In some embodiments, it may be desirable to also define Active Source Uniformity to exclude rows such as row 2, in which all the attributes are missing data.

$$ActiveSourceUniformity_i = \sum_j Cases_j \bigg/ \sum_m Cases_m \text{ for } RowUniformity_{ij} = \text{TRUE} \quad (8)$$

Where j and m exclude rows where all attributes of source i have value 0
Note that this implies:

$$ActiveSourceUniformity_i \leq SourceUniformity_i \quad (9)$$

This may be desirable where there are a large number of cases without any data, as the Source Uniformity may give an unrealistic picture of the uniformity of the data. In FIG. 9A, the Active Source Uniformity excludes row 2, and can be seen to be (2811/(3055−206)) or 98.6%, not significantly less than the Source Uniformity of 98.8%.

FIG. 9B shows a missing data pattern table for a prospective model of calculated dollar cost using three attributes from data source 2, plus three more attributes from data source 4, according to one embodiment. This table is sorted according to the Column Joint Row Uniformity Source 2 and 4. In one embodiment, a joint uniformity for sources i and k considered jointly can be defined on a row j of the missing data table for sources i and k, similarly to the above equations:

$$JointRowUniformity_{(ik)j} = RowUniformity_{ij} \text{ AND } RowUniformity_{kj} \quad (10)$$

$$JointSourceUniformity_{ik} = \sum_j Cases_j \bigg/ \sum Cases \text{ for } JointRowUniformity_{(ik)j} = \text{TRUE} \quad (11)$$

$$JointActiveSourceUniformity_i = \sum_j Cases_j \bigg/ \sum_m Cases_m \text{ for } RowUniformity_{ij} = \text{TRUE} \quad (12)$$

Where j and m exclude rows where all attributes
of source i AND of source k have value 0

$$JointActiveSourceUniformity_i \leq JointSourceUniformity_i \quad (13)$$

For example, Joint Row Uniformity Source 2 and 4 is TRUE for row number 1 of the table of FIG. 9B, because the three attributes from source 2 all have the value 1, and the three attributes from source 4 all have the value 0. Note that row number 3, but not rows 1 and 4, would be excluded for the purposes of calculation of Joint Active Source Uniformity. The Joint Source Uniformity of sources 2 and 4 in this example is shown to be 97.7%.

In one embodiment, actual dollar cost will be calculated by modeling using groups in an iterative joint modeling process as will be discussed in more detail with reference to FIG. 12. The method described in FIG. 12 addresses the problem of the missing data in a dataset which has few complete cases by using groups defined by the functions above in a set order thereby lessening estimation bias. Prior to this, groups must be selected and ordered.

Figure 10:
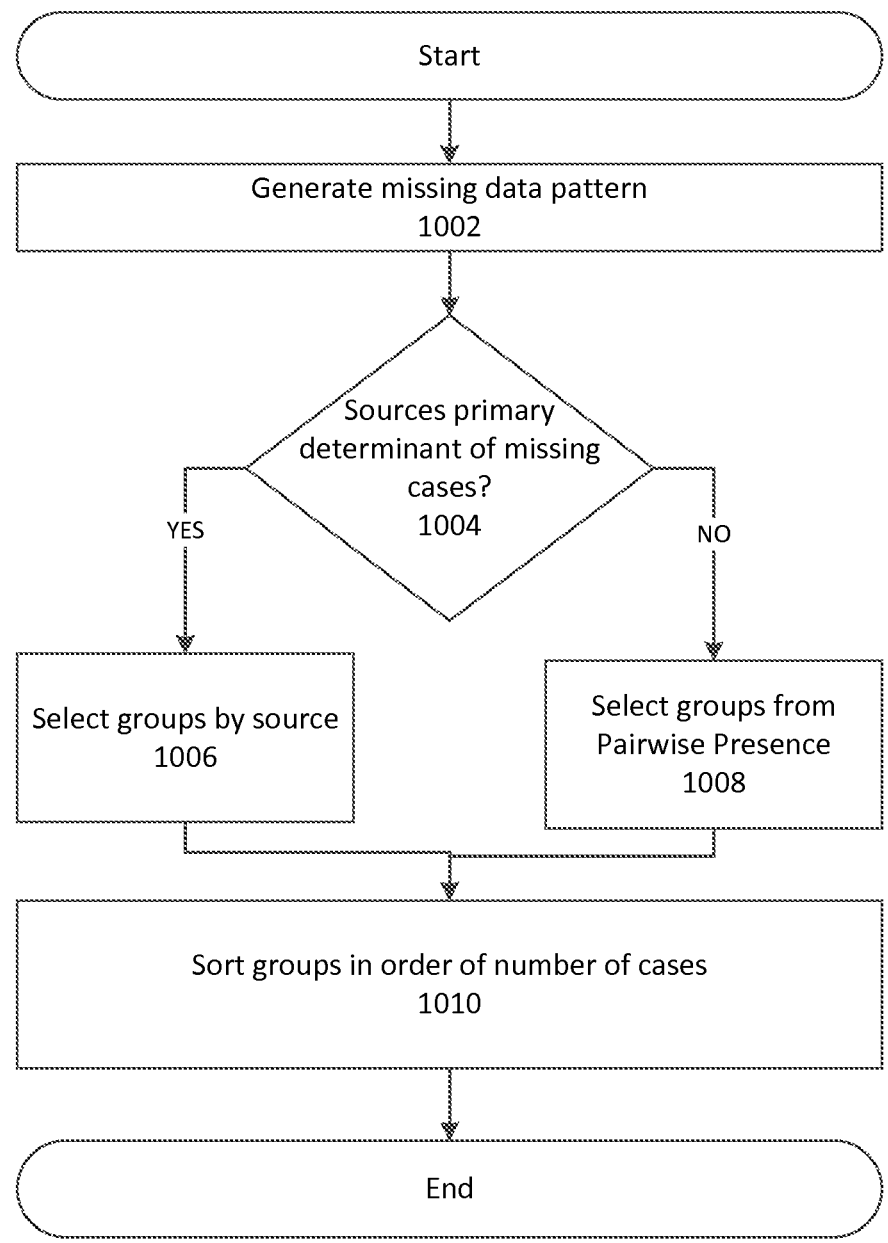
FIG. 10 shows a flowchart showing how groups that are to be used in the iterative process of modeling adjusted dollar cost are determined and ordered according to one embodiment.

FIG. 10 is a flowchart showing how groups that are to be used in the iterative process of modeling adjusted dollar cost are determined and ordered according to one embodiment. In this embodiment, in step 1002, a missing data pattern is generated for the predictor variables or the predictions from their individual models that were found to be useful for subsequent determinations of adjusted dollar cost as per the process in FIG. 5. In step 1004, the missing data pattern is then examined to determine whether the primary determinant of the missing cases is their source. This determination can be made in a variety of ways. In one embodiment, the sources are assumed to be the primary determinant of missing cases. In that embodiment, the answer to step 1004 is "yes" and the process continues to step 1006. In one embodiment, human inspection of the missing data pattern is used to make the determination in step 1004. In another embodiment, the determination in step 1004 can be made programmatically by comparing the Joint Source Uniformity or Joint Active Source Uniformity to a chosen threshold. In one embodiment, if all the joint uniformity values are above the threshold, then all the sources are treated as groups. In another embodiment, a uniformity threshold or active uniformity threshold is chosen, such as 75% for example, and the predictor variables for all sources whose Source Uniformity is above that threshold are grouped by source in step 1006 and any remaining predictor variables are grouped according to step 1008. In embodiments using a uniformity threshold, Source Uniformity is measured by Source Uniformity (equation 7) or Active Source Uniformity (equation 8). If the answer to step 1004 is "no", then the predictor variables from any other sources are grouped according the missing data pattern as per step 1008. How groups are selected from pairwise presence in step 1008 is explained in detail in FIG. 11. In another embodiment, the sources are not considered, and all predictor variables are grouped according to the missing data pattern. In other words, step 1004 is not performed, and flow proceeds from step 1002 directly to step 1008.

Once the groups are selected by one or both of steps 1006 and 1008, the groups are sorted in order of the number of cases in step 1010. Specifically, the group that has the largest number of complete cases, considering the predictor variable values and/or the values of the predictions of the predictor variable's individual models in that group, will be used by the process of FIG. 12 first. Each group is then used in turn in the process of FIG. 12 to calculate a dollar cost estimate, which is used to update the adjusted dollar cost.

Figure 11:
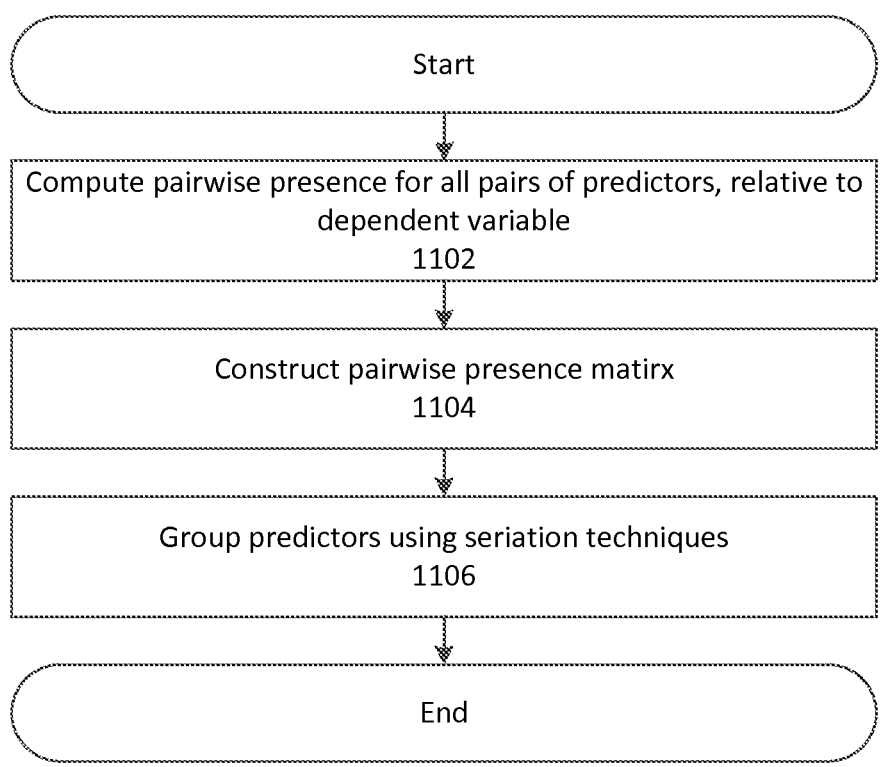
FIG. 11 shows a flowchart describing how groups are selected based on their pairwise presence according to one embodiment.

FIG. 11 shows a flowchart describing how groups are selected based on their pairwise presence according to one embodiment. Here, the groups are selected solely from the missing data pattern, without reference to sources. In this embodiment, in step 1102, pairwise presence is computed for each pair of predictor variables i and j relative to the dependent variable d as follows:

$$PairwisePresence_{ij,d} = \frac{\text{sum}(\text{available}(i) \text{ AND available}(j) \text{ AND available}(d))}{\text{sum}((\text{available}(i) \text{ OR available}(j)) \text{ AND available}(d))} \quad (14)$$

Where available(i) is defined as a function operating on the attribute i of a database, and producing a vector of 1's or 0's corresponding to whether data is available for that attribute for each entity; the logical functions AND and OR operate element-by-element on the vectors. This is comparable to constructing the missing data pattern for the dependent variable and the two predictor variables I and j, and dividing the number of case for the row with pattern (1,1,1) by the sum of the rows (1,1,1),(1,1,0),(1,0,1). For example, FIG. 9C illustrates this construction. FIG. 9C is a missing data table showing pairwise presence of two predictor variables according to one embodiment. In this figure it can be seen by referring to rows 1 through 3 that the pairwise presence of Source 2 Dress and Source 4 Dress relative to calculated dollar cost is equal to 1090/(1090+28+1749), or 38%. By contrast, in FIG. 9D, another missing data table showing pairwise presence of two predictor variables according to one embodiment, it can be seen that the pairwise presence of Source 2 Dress and Source 2 Noise Level is 98.9%. This large difference in pairwise presence confirms the source-based structure of the data availability of these predictor variables. In step 1104 of FIG. 11, a Pairwise Presence matrix P is constructed, simply by treating the pairwise presence for predictor variables i and j as element (i,j) of P. Now, P will look like a correlation matrix. That is, all elements of P are in the interval [−1,1], as they are all in the interval [0,1], and the diagonal is equal to 1. In step 1106 of FIG. 11, the groups are determined using seriation techniques on the matrix P. Seriation here refers to a broad range of techniques that have been developed for clustering columns of a matrix such as P, and which are implemented and available in various software packages. For example, the seriation package in the statistical language R contains a variety of techniques that can return groups based on mutually large values of P. Three non-limiting examples of these techniques include hierarchical clustering and principal component analysis, and Bond Energy Algorithms. It will be observed that when source is a dominant determinant of data availability, as illustrated by FIG. 9C and FIG. 9D, then any of these seriation techniques will tend to produce groups that correspond to the sources: groups derived from the seriation technique will be segregated by source, with source 1 predictor variables in a group, source 2 predictor variables in another group, etc.

FIG. 12 shows a process of how groups are individually used resulting in an iterative process of predicting dollar cost estimates and updating adjusted dollar cost according to one embodiment. In step 1201, a group is accepted for processing. These groups are accepted in the order determined by the process in FIG. 10. In step 1202, an NA level is added to all categorical (including logical) variables. This step is performed for two reasons. First, it ensures that the maximum number of cases will be preserved from list deletion, as complete cases for the group now consist of entities with data in any of the group's predictor variables or predictions from their individual models rather than requiring that the entities have data in all of the group's predictor variables or prediction attributes. Second, it protects against estimation bias resulting from data being missing not completely at random as discussed above. Examples of how the NA level is added in step 1202 are provided in FIG. 13B and FIG. 14B according to different embodiments. Next, if it is determined that this is the first group to be processed in step 1203, then calculated dollar cost is set as the dependent variable in step 1204. If not, then the adjusted dollar generated from the first group is set as the dependent variable. As explained above, the groups have been ordered as per the process in FIG. 10 prior to entering the process in FIG. 12. Therefore, only the first iteration will use calculated dollar cost as the dependent variable. The second iteration will use adjusted dollar cost as the dependent variable, and all subsequent iterations will use the adjusted dollar cost calculated from the previous iteration as the dependent variable. In this manner, dollar cost estimates and ultimately adjusted dollar cost are iteratively updated based on each joint model used for each new group used in the process.

Using all the rows for which the dependent and independent variables (the grouped predictor variables) are available, i.e., the complete cases, in step 1206, a model of the dependent variable using the group predictor variables as independent variables is created in step 1208. This model can now be used to produce a dollar cost estimate for all the rows for which data in any of the independent variables are available, step 1214. This dollar cost estimate is then used in step 1216 to update the adjusted dollar cost as discussed above and shown in equations 1-4. Once step 1216 is completed, the next group is processed based on the order of groups determined in FIG. 10, and the adjusted dollar cost becomes the new dependent variable as shown in steps 1203 and 1206. The process of FIG. 12 is repeated for each group until all groups defined and sorted by the process in FIG. 10 have been processed.

FIG. 13A through FIG. 14B show in tabular format how adding an NA value for predictor variables can be utilized to provide dollar cost estimates for entities missing data according to different embodiments. These figures provide simplified examples of how step 1202 of FIG. 10 can impact the modeling process. FIG. 13A shows an example of a one-variable categorical model according to one embodiment. In this model, the predictor variable, cost, has four possible values ($, $$, $$$, $$$$). In different embodiments, the Dollar Cost Estimates might be modeled based on a simple average of the calculated dollar costs for entities in the relevant categories, or by other more complex methods such as described in FIG. 5. FIG. 13B shows a similar categorical model as FIG. 13A, but with an additional column, coded as NA, that has been added to account for missing data according to one embodiment. In this embodiment, entities without a value for the predictor variable cost are assigned a coded value. This allows the model to generate estimates for all entities, including those without a value in the four cost categories ($, $$, $$$, $$$$). In this example, the dollar cost estimate for entities without cost values is 25, falling between the values for categories $ and $$. The use of this NA level technique has the advantage that it results in dollar cost estimates for all entities. This is an advantage in joint modeling, as there will now be no cases deleted as a result of this attribute. The NA level technique also has the advantage of dealing with the potential bias involved in deleting cases due to missing data, as discussed above. Since, in this embodiment, the model is considering the entities with NA as a defined category, the value of $25 in the example shown is determined by the same method as that of the other categories (e.g. by some method of averaging).

FIG. 14A shows a joint categorical model of dollar cost estimates based on two predictor variables, Cost and Fast Food, according to one embodiment. Here, the dollar cost estimates increase with Cost, and there is a large difference between the Estimates based on the Fast Food attribute; for example, the dollar cost estimate for a Cost of $$$ is 48 for a non-fast-food restaurant, but only 18 for a fast-food restaurant. Thus, even in a simple two variable model, the dollar cost estimate can provide useful insight regarding the restaurant entities. FIG. 14B shows a similar joint categorical model to that of FIG. 14A where NA level coding has been used for both variables, Cost and Fast Food. There are now 15 values the estimate can assume corresponding to the five categories of cost ($, $$, $$$, $$$$, NA) in view of the three categories of Fast Food (T, F, NA), which result in 15 possible inputs. As explained above, in some embodiments, adding the NA level is beneficial in modeling dollar cost estimates and ultimately adjusted dollar costs by increasing the number of cases used to predict dollar cost estimates, and in eliminating bias. In different embodiments, models similar to those of FIG. 13B and FIG. 14B are used in the calculations shown in FIG. 15, which is discussed next.

FIG. 15 shows an exemplary data table that might be generated from the iterative process to calculate adjusted dollar cost shown in FIG. 12 according to one embodiment. In this example, the first iteration is performed using only the four predictor variables identified in FIG. 6 which are indicated with a "Yes" in the column Used in Subsequent Steps of Modeling of Adjusted Dollar Cost. These four columns all use source 2 data. These four predictor variables represent the first group as might be determined in step 1203 of FIG. 12. In this example, the calculated dollar cost is used as the dependent variable as in step 1204 of FIG. 12. In this example, calculated dollar cost, shown in the column Dependent Variable for Source 2 Predictor Variables, is the same as Source 1 Cost, as was the case in FIG. 6. A model is constructed as per step 1208 of FIG. 12, and the predictions from that model, as calculated in step 1214 of FIG. 12, appear in the column Dollar Cost Estimate from Source 2 Predictor Variables. Here, a multiple linear model was created using the four independent variables using a standard statistical software package. Although only a portion of the data table in FIG. 15 is shown due to size restrictions, it can be seen, referring to FIG. 8, that this model did in fact create predictions using the 3056 cases for which data was available for calculated dollar cost. The model also made predictions for all entities that had data in any of the source 2 predictor variables, which amounts to 12540 cases (not all of which are shown in FIG. 15), which is slightly more than the 11519 (the sum of 2883 and 8636), the number of entities for which source 2 Cost is known.

In this embodiment, the column Adjusted Dollar Cost Using Source 2 Dollar Cost Estimate is calculated as per equations 1-4. In this example, the weights used were 0.6 for calculated dollar cost, i.e., Dependent Variable for Source 2 Predictor Variables, and 0.4 for the Dollar Cost Estimate from Source 2 Predictor Variables. This has the effect of giving the calculated dollar cost somewhat more weight than in a simple average. After the adjusted dollar cost is determined in step 1216, the adjusted dollar cost is retained as Adjusted Cost using Source 2 Dollar Cost Estimate. The next group used in the process of FIG. 12 to calculate adjusted dollar cost, in this embodiment, contains the two predictor variables from source 4 which are Source 4 Cost and Source 4 Dress as shown in FIG. 15. As per FIG. 12, using this group, the dependent variable for the new model is the Adjusted Dollar Cost using Source 2 Dollar Cost Estimate column from the previous step. A new model is created using the source 4 predictor variables as independent variables, and produces the new column Dollar Cost Estimate from Source 4 Predictor Variables. In this embodiment, the column Adjusted Dollar Cost using Source 4 Dollar Cost Estimate is calculated as per equations 1-4. In this case, the weights used were 0.7 for the dependent variable and 0.3 for the source 4 predictor variables.

An example of the use of NA levels can be seen in row r00009 of FIG. 15. For this restaurant, the attributes Source 2 Cost and Source 2 Dress are not available. Because the NA level technique was used, this restaurant was not deleted from the model created using the source 2 predictor variables. Instead the joint model created an estimate of $22.64, using just the information in the other two predictor variables in the source 2 group, namely Source 2 Fast Food and Source 2 Takes Reservations. Other aspects of how missing data is dealt with can be seen by examining other rows. For example, row r000021 has missing data in Dependent Variable for Source 2 Predictor Variables. In this embodiment, this row is not used in the creation of the model, but once the model is created using data from other rows, it is used to create the Dollar Cost Estimate from Source 2 Predictor Variables of $34.86. Row r000022 has missing data in both the dependent and independent variables for source 2, so no estimate is generated from the source 2 model. There is data for the source 4 variables for this model, so there is a value of $47.87 in the column Dollar Cost Estimate from Source 4 Predictor Variables, based on the values of "$$$" for Source 4 Cost and "Casual Dress" for Source 4 Dress. Row r000027 has no data in any of the independent variables, nor is there data in the initial dependent variable. As a result, there is no adjusted dollar cost that can be calculated here.

The table in FIG. 15 shows not only how adjusted dollar costs are calculated for entities that have a calculated dollar cost available, but also how processing each group of predictor variables adds dollar cost estimates and thereby adjusted dollar costs for entities that do not have calculated dollar costs available according to one embodiment. In the rows for restaurants r000021 through r000023, there is no Source 1 Cost and therefore no Dependent Variable for Source 2 Predictor Variables, i.e., no calculated dollar cost. After the first iteration, however, a Dollar Cost Estimate from Source 2 Predictor Variables is available for restaurant r000021, because each of the source 2 predictor variables had values enabling the calculation of the dollar cost estimate. Similarly, after the second iteration, values for Dollar Cost Estimate from Source 4 Predictor Variables appear for the first time, because each of the source 4 predictor variables had values enabling the calculation of the dollar cost estimates. In this embodiment, with each new iteration, adjusted dollar costs are updated or newly added where there previously were none.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an 55 erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be executed entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for executing computer software to generate adjusted dollar cost; the system comprising:
   a processor;
   computer-readable memory coupled to the processor;
   a network interface coupled to the processor;
   a data processing system programmed to:
      navigate to a plurality of third party data sources;
      search for information associated with one or more entities on the plurality of third party data sources;
      identify a subset of third party data sources from the plurality of third party data sources including the searched information associated with one or more entities;
      identify predefined types of information on each of the subset of third party data sources, wherein the predefined types of information include one or more dollar costs and one or more predictor variables;
      extract the one or more dollar costs and the one or more predictor variables, from the subset of third party data sources, wherein at least one of the one or more predictor variables includes a longitude and latitude data associated with the location of the one or more entities;
      automatically store the extracted dollar costs and the predictor variables directly from the subset of third party data sources in a database, using an application programming interface API;
      encode the longitude and latitude data;
      determine a dollar cost from one or more of the dollar costs for the entities with one or more dollar costs;
      identify one or more groups;
      determine an order of the one or more groups for use in predicting dollar cost estimates;
      predict dollar cost estimates by joint modeling the dollar costs or adjusted dollar costs as a first independent variable and using the one or more of the groups as a second independent variable;
      determine adjusted dollar costs for one or more of the entities that have a dollar cost estimate in their record from at least in part the dollar cost estimates for those entities;
      construct one or more of individual models for each of the predictor variables with the dollar cost as the dependent variable for only the entities with a calculated dollar cost in their record;
      measure a goodness-of-fit for each of the individual models;
      select, from the set of individual models for each of the predictor variables, the individual model with the best goodness-of-fit measurement; and
      discard from further calculations the predictor variables with the individual models with the best goodness-of-fit measurement below a goodness-of-fit threshold value.

2. The system of claim 1 wherein the data processing system is further programmed to send the adjusted dollar costs for one or more entities to users.

3. The system of claim 1, wherein the entities are restaurants.

4. The system of claim 1, wherein the entities are hotels.

5. The system of claim 1 wherein the data processing system is further programmed to select from the set of the individual models for each of the predictor variables the individual model with the best goodness-of-fit measurement, wherein the predictors associated with the individual model with the best goodness-of-fit are used in the groups.

6. The system of claim 1 wherein the data processing system is further programmed to select from the set of the individual models for each of the predictor variables the individual model with the best goodness-of-fit measurement, wherein the predictions of the individual models with the best goodness-of-fit measurements are used in the groups.

7. The system of claim 1, wherein the groups are determined by at least one of source uniformity, row uniformity, joint source uniformity, active source uniformity, or pairwise presence.

8. A computer implemented method of calculating adjusted dollar costs for entities, comprising:
   navigating to the one or more third party data sources;
   searching for associated with one or more entities on the plurality of third party data sources;
   identifying a subset of third party data sources from the plurality of third party data sources including the searched information associated with one or more entities;
   identifying predefined types of information on each of the subset of third party data sources, wherein the predefined types of information include one or more dollar costs and one or more predictor variables;
   extracting the one or more dollar costs and the one or more predictor variables, from the subset of third party data sources, wherein at least one of the one or more predictor variables includes a longitude and latitude data associated with the location of the one or more entities;
   automatically storing the extracted dollar costs and the predictor variables directly from the subset of third party data sources in a database, using an API;
   encoding the longitude and latitude data;
   determining a dollar costs from one or more of the dollar costs available for the entities that have a dollar cost value in their record;
   identifying one or more groups;
   determining an order of the one or more groups for use in predicting dollar cost estimates;
   predicting dollar cost estimates by joint modeling the dollar costs or adjusted dollar costs as a first independent variable and using the one or more of the groups as a second independent variable;
   determining the adjusted dollar costs for one or more of only the entities that have a dollar cost estimate in their record from at least in part the dollar cost estimates for those entities;
   constructing one or more of individual models for each of the predictor variables with the dollar cost as the dependent variable for only the entities with a calculated dollar cost in their record;
   measuring a goodness-of-fit for each of the individual models;
   selecting, from the set of individual models for each of the predictor variables, the individual model with the best goodness-of-fit measurement; and
   discarding from further calculations the predictor variables with the individual models with the best goodness-of-fit measurement below a goodness-of-fit threshold value.

9. The method of claim 8, wherein the entities are restaurants.

10. The method of claim 8, wherein the entities are hotels.

11. The method of claim 8, further comprising:
   providing the adjusted dollar costs for one or more of the entities to users.

12. The method of claim 8, wherein only objective predictor variables or the predictions from objective predictor variables' individual models form the groups.

13. The method of claim 8, further comprising:
   retaining only the predictor variables with their individual models from their one or more models having the best goodness-of-fit measurement to form the groups.

14. The method of claim 8, further comprising:
   retaining only the predictions of the individual models of the predictor variables with the individual models from the predictor variable's one or more models having the best goodness of fit measurement to form the groups.

15. The method of claim 8, wherein the groups are determined by at least one of source uniformity, row uniformity, joint source uniformity, active source uniformity, or pairwise presence.

16. The method of claim 15, wherein the predicting dollar cost estimates step and the calculating adjusted dollar costs step include the steps of:
   predicting the dollar cost estimates for a first group by joint modeling the calculated dollar costs as the dependent variable and the first group as the independent variables for all entities having at least one predictor variable value or the value of a prediction of a predictor variable's individual model in its record;
   calculating adjusted dollar costs from the dollar cost estimates predicted from the first group and the calculated dollar costs for all entities with a calculated dollar cost in their record; setting adjusted dollar costs equal to the dollar cost estimates predicted from the first group for all entities without a calculated dollar cost in their record;
   predicting iteratively new dollar cost estimates for each new group by joint modeling dollar cost estimates using the adjusted dollar costs from the previous iteration as the dependent variable and the new group as the independent variables;
   calculating new adjusted dollar costs from the new dollar cost estimates and the adjusted dollar costs from the previous iteration for all entities with an adjusted dollar cost in their record; and
   setting new adjusted dollar costs equal to the new dollar cost estimates for all entities without an adjusted dollar cost in their record.

17. The method of claim 13, further comprising:
   using NA level coding for all categorical and logical predictor variables.

18. A non-transitory computer readable medium including instructions that, when executed by a processor of a central server, cause the central server to:
   navigate to the one or more third party data sources;
   search for associated with one or more entities on the plurality of third party data sources;
   identify a subset of third party data sources from the plurality of third party data sources including the searched information associated with one or more entities;
   identify predefined types of information on each of the subset of third party data sources, wherein the predefined types of information include one or more dollar costs and one or more predictor variables;
   extract the one or more dollar costs and the one or more predictor variables, from the subset of third party data sources wherein at least one of the one or more predictor variables includes a longitude and latitude data associated with the location of the one or more entities;

automatically store the extracted dollar costs and the predictor variables directly from the subset of third party data sources in a database, using an API;

encode the longitude and latitude data;

determine a dollar costs from one or more of the dollar costs available for the entities that have a dollar cost value in their record;

identifying one or more groups;

determine an order of the one or more groups for use in predicting dollar cost estimates;

predict dollar cost estimates by joint modeling the dollar costs or adjusted dollar costs as a first independent variable and using the one or more of the groups as a second independent variable;

determine the adjusted dollar costs for one or more of only the entities that have a dollar cost estimate in their record from at least in part the dollar cost estimates for those entities;

construct one or more of individual models for each of the predictor variables with the dollar cost as the dependent variable for only the entities with a calculated dollar cost in their record;

measure a goodness-of-fit for each of the individual models;

select, from the set of individual models for each of the predictor variables, the individual model with the best goodness-of-fit measurement; and discard from further calculations the predictor variables with the individual models with the best goodness-of-fit measurement below a goodness-of-fit threshold value.

* * * * *